United States Patent
Koga et al.

(10) Patent No.: US 7,166,951 B2
(45) Date of Patent: Jan. 23, 2007

(54) ELECTROSTATIC ACTUATOR AND METHOD OF DRIVING THE SAME

(75) Inventors: Akihiro Koga, Kawasaki (JP); Mitsunobu Yoshida, Kawasaki (JP); Akihiro Kasahara, Sambu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 648 days.

(21) Appl. No.: 10/299,662

(22) Filed: Nov. 20, 2002

(65) Prior Publication Data

US 2005/0253481 A1   Nov. 17, 2005

(30) Foreign Application Priority Data

Nov. 20, 2001   (JP)   ............................. 2001-355098

(51) Int. Cl.
  H02N 1/00   (2006.01)
(52) U.S. Cl. ...................................... 310/309; 318/116
(58) Field of Classification Search ............... 310/309; 318/116
  See application file for complete search history.

(56) References Cited

U.S. PATENT DOCUMENTS

| | | | | |
|---|---|---|---|---|
| 5,534,740 | A * | 7/1996 | Higuchi et al. ............. | 310/309 |
| 6,531,804 | B2 * | 3/2003 | Kasahara ..................... | 310/309 |
| 6,611,079 | B2 * | 8/2003 | Koga et al. .................. | 310/309 |
| 6,670,738 | B2 * | 12/2003 | Kasahara et al. ........... | 310/309 |
| 6,680,558 | B2 * | 1/2004 | Akiba et al. ................. | 310/309 |
| 6,713,939 | B2 * | 3/2004 | Kasahara ..................... | 310/309 |
| 6,717,326 | B2 * | 4/2004 | Koga et al. .................. | 310/309 |
| 6,750,591 | B2 * | 6/2004 | Akiba et al. ................. | 310/309 |
| 6,765,332 | B2 * | 7/2004 | Akiba ......................... | 310/309 |
| 6,774,534 | B2 * | 8/2004 | Akiba et al. ................. | 310/309 |
| 6,781,281 | B2 * | 8/2004 | Koga et al. .................. | 310/309 |

(Continued)

FOREIGN PATENT DOCUMENTS

EP   0 911 952   4/1999

(Continued)

OTHER PUBLICATIONS

Akihiro Koga, et al. "Electrostatic Linear Microactuator Mechanism for Focusing a CCD Camera," Journal of Lightwave Technology (by IEEE), vol. 17, No. 1, Jan. 1999, pp. 43-47.

(Continued)

*Primary Examiner*—Karl I. E. Tamai
(74) *Attorney, Agent, or Firm*—Oblon, Spivak, McClelland, Maier & Neustadt, P.C.

(57) ABSTRACT

First and second stationary members are arranged to face each other, and a movable member is arranged between these first and second stationary members so as to be movable in a predetermined direction. An electrode groups including a plurality of stationary electrodes having the same width and sequentially arranged at substantially the same pitch in a predetermined direction is formed on each of these stationary electrodes. Also, a movable electrode having a width in the predetermined direction, which is larger than the width of each of the stationary electrodes constituting the electrode group, is arranged on the movable member. First and second voltage signal patterns differing from each other in the timing are applied to the stationary electrodes constituting the electrode group. When the movable member is driven in the predetermined direction by one of the first and second voltage signal patterns, the voltage signal pattern serving to drive the movable member is determined as the driving signal.

8 Claims, 20 Drawing Sheets

U.S. PATENT DOCUMENTS

| | | | |
|---|---|---|---|
| 6,784,594 B2 * | 8/2004 | Kasahara et al. | 310/309 |
| 6,806,618 B2 * | 10/2004 | Koga et al. | 310/309 |
| 6,806,661 B2 * | 10/2004 | Kasahara et al. | 318/116 |
| 6,829,433 B2 * | 12/2004 | Kasahara | 396/75 |
| 6,900,576 B2 * | 5/2005 | Koga et al. | 310/309 |
| 6,924,940 B2 * | 8/2005 | Koga et al. | 359/694 |
| 2005/0253481 A1 * | 11/2005 | Koga et al. | 310/309 |

FOREIGN PATENT DOCUMENTS

| | | | |
|---|---|---|---|
| EP | 1 139 553 | | 10/2001 |
| JP | 04271284 | * | 9/1992 |
| JP | 10-150781 | | 6/1998 |
| JP | 11281870 | * | 10/1999 |
| JP | 2001-346385 | | 12/2001 |
| KR | 2001-0095010 | | 11/2001 |

OTHER PUBLICATIONS

U.S. Appl. No. 10/299,662, filed Nov. 20, 2002, Koga et al.
Patent Abstracts of Japan, JP 10-239578, Sep. 11, 1998.
U.S. Appl. No. 11/377,191, filed Mar. 17, 2006, Akiba et al.

* cited by examiner

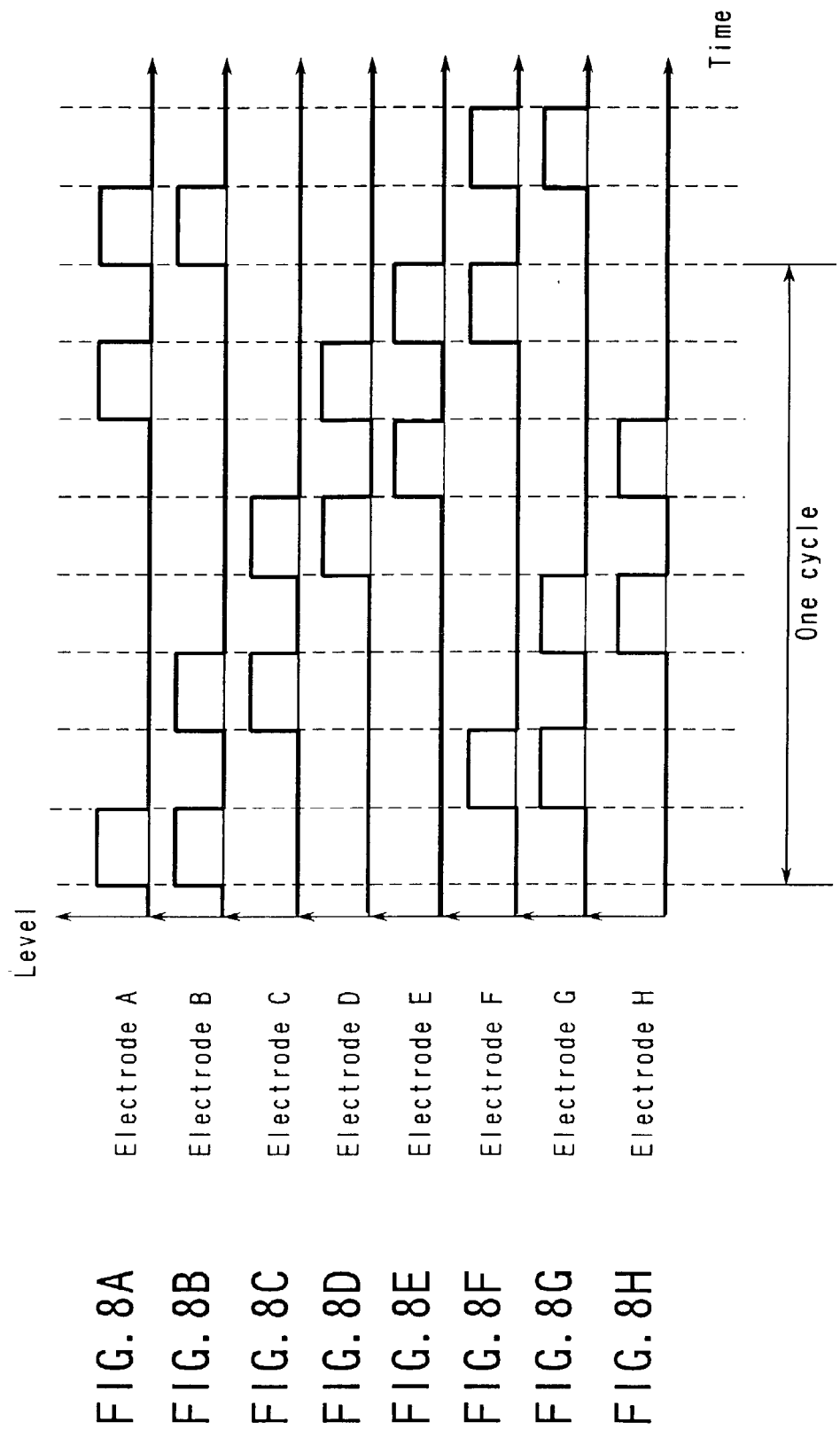

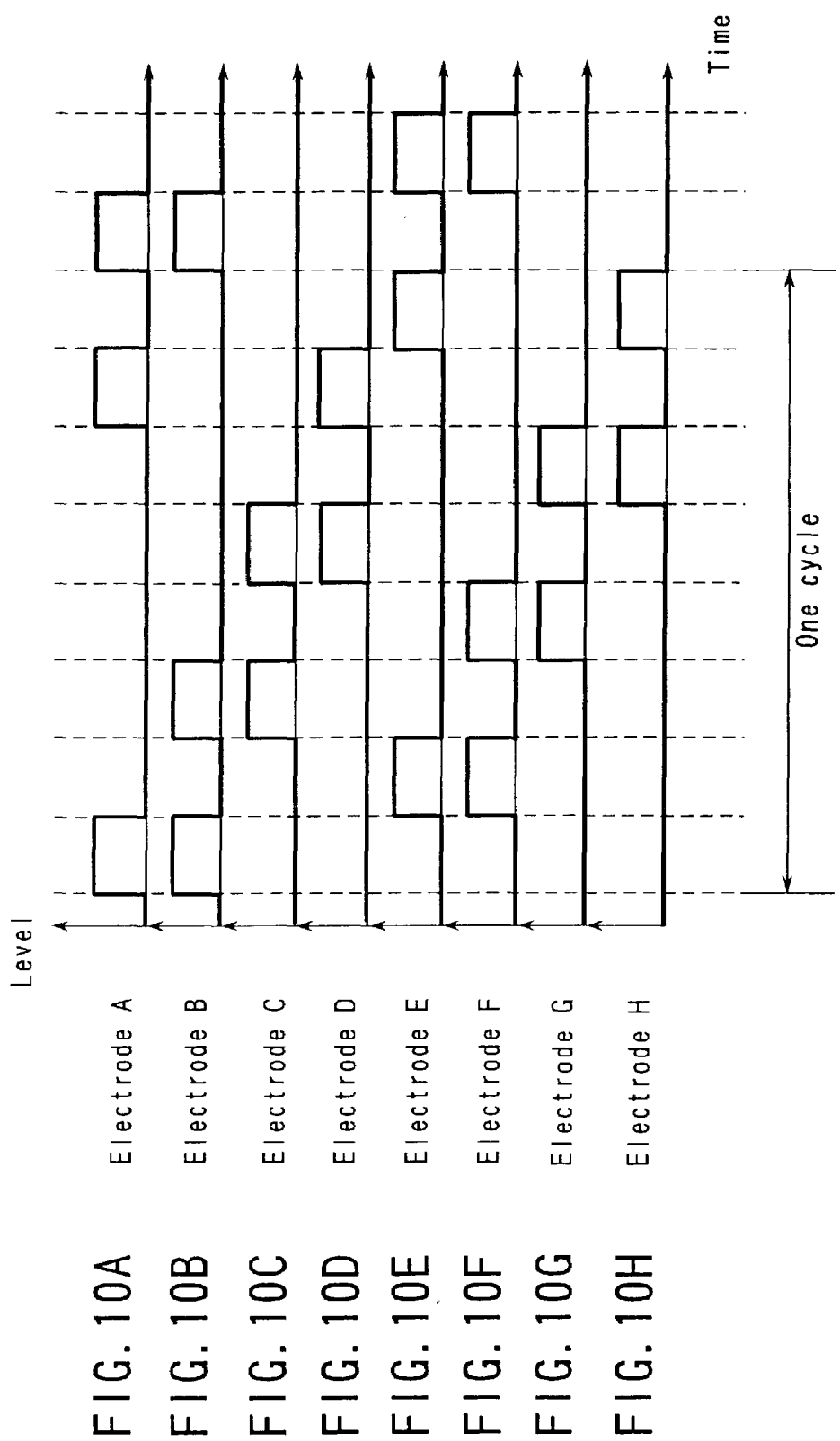

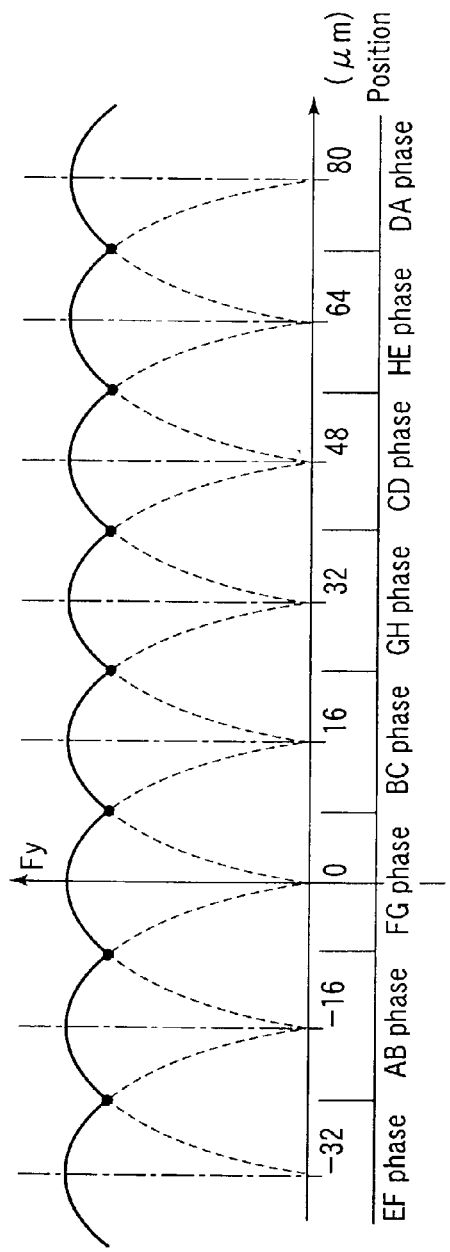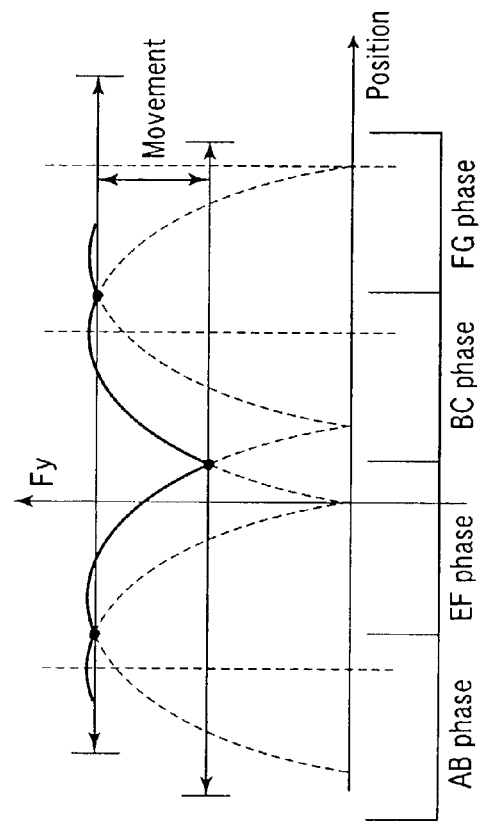
FIG.11
FIG.12

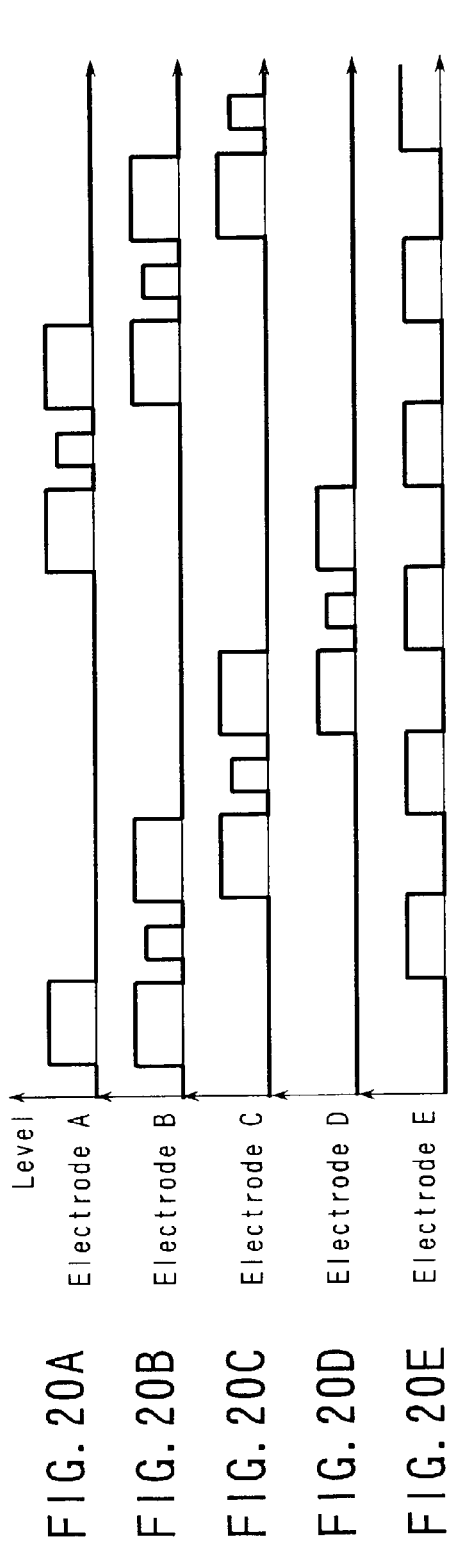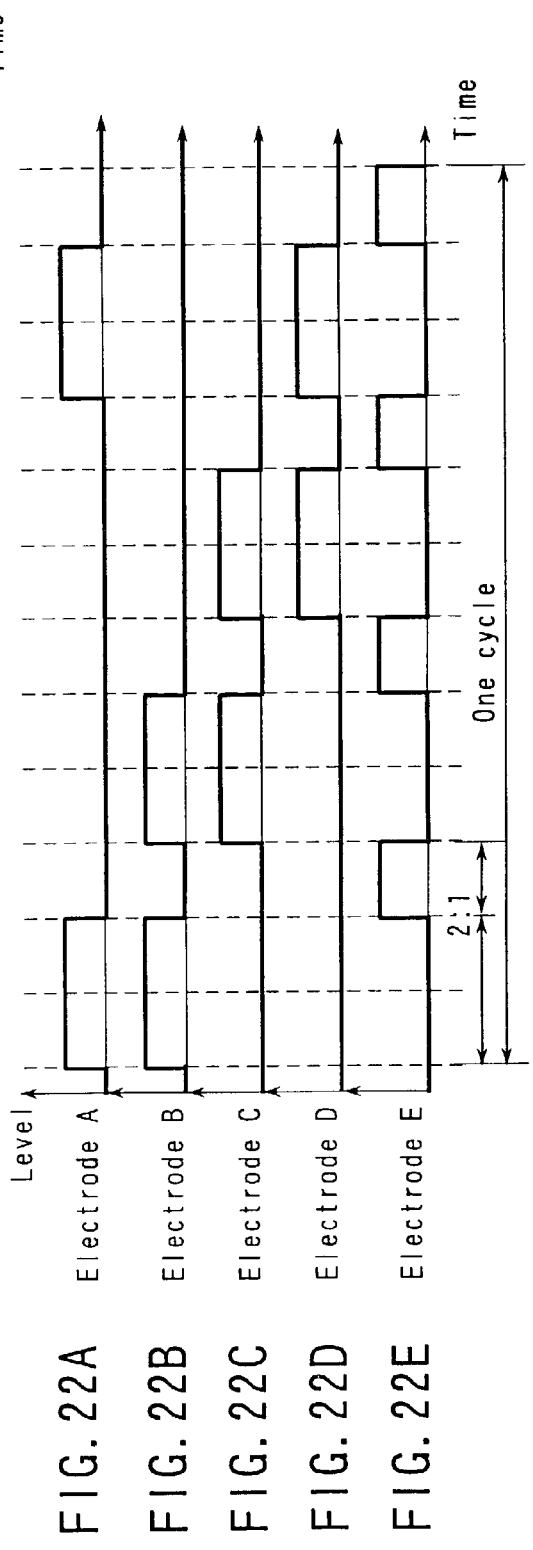

ELECTROSTATIC ACTUATOR AND METHOD OF DRIVING THE SAME

CROSS-REFERENCE TO RELATED APPLICATIONS

This application is based upon and claims the benefit of priority from the prior Japanese Patent Application No. 2001-355098, filed Nov. 20, 2001, the entire contents of which are incorporated herein by reference.

BACKGROUND OF THE INVENTION

1. Field of the Invention

The present invention relates to an electrostatic actuator in which a movable member is driven by an electrostatic force, and a method of driving the electrostatic actuator, particularly, to an electrostatic actuator in which the movable member can be driven with a high accuracy, and a method of driving the electrostatic actuator.

2. Description of the Related Art

An electrostatic actuator in which the movable member is driven by an electrostatic force is disclosed in several publications, e.g., Japanese Patent Disclosure (Kokai) No. 8-140367, Japanese Patent No. 2928752, and "Electrostatic Linear Microactuator Mechanism" in "JOURNAL OF LIGHT WAVE TECHNOLOGY", Vol. 17, No. 1, January 1999, IEEE". In the electrostatic actuator disclosed in each of these publications, the electrodes are arranged as shown in, for example, FIG. 1, as disclosed in Japanese Patent No. 2928752 referred to above. In the electrostatic actuator shown in FIG. 1, a movable member 101 is arranged slidable between stationary members 102 and 103, which are arranged to face each other. While making the sliding movement between the stationary members 102 and 103, the movable member 101 is moved forward as denoted by an arrow 110 or backward in the direction opposite to the direction denoted by the arrow 110. Electrode sections 106 are formed in the movable member 101. On the other hand, two systems of stationary electrodes 102a and 102c, to which a voltage is applied at different timings, are alternately arranged in the stationary member 102. Likewise, two systems of stationary electrodes 103b and 103d, to which a voltage is applied at different timings, are alternately arranged in the other stationary member 103. The stationary electrodes 102a, 102c, 103b, 103d, which are formed in the stationary members 102 and 103, and the electrode sections 106 of the movable member 101 have substantially equal dimensions in the pitch and the electrode width. It should be noted that the stationary electrodes 102a and 102c formed in the stationary member 102 and the stationary electrodes 103b and 103d formed in the stationary member 103, the stationary electrodes 102a, 102c being positioned to face the stationary electrodes 103b, 103d, are arranged such that the phase of the arrangement is shifted from each other by ½.

If voltage is applied from a voltage source 104 to the stationary electrode 102a via a switching circuit 105 in the electrostatic actuator of the construction described above, an electrostatic force, i.e., the Coulomb force, is produced between the stationary electrode 102a and the movable electrode 106, with the result that the movable member 101 is attracted toward the stationary member 102 in a manner to permit the stationary electrode 102a and the movable electrode 106 to be overlapped with each other. Then, when the switching circuit 105 is switched from the stationary electrode 102a to the stationary electrode 103b so as to permit voltage to be applied to the electrode 103b, the movable member 101 is attracted toward the other stationary member 103 in a manner to permit the stationary electrode 103b and the movable electrode 106 to be overlapped with each other. Further, when the switching circuit 105 is switched from the stationary electrode 103b to the stationary electrode 102c so as to permit voltage to be applied to the stationary electrode 102c, the movable member 101 is attracted again toward the stationary member 102 in a manner to permit the stationary electrode 102c and the movable electrode 106 to be overlapped with each other. Still further, when the switching circuit 105 is switched from the stationary electrode 102c to the stationary electrode 103d so as to permit voltage to be applied to the stationary electrode 103d, the movable member 101 is attracted again toward the stationary member 103 in a manner to permit the stationary electrode 103d and the movable electrode 106 to be overlapped with other. It follows that, if voltage is successively applied to the stationary electrodes 102a, 103b, 102c and 103d by switching the switching circuit 105, the movable member 101 is macroscopically moved forward in the direction denoted by the arrow 110 while being microscopically vibrated between the stationary members 102 and 103. On the other hand, if voltage is applied successively to the stationary electrodes 103d, 102c, 103b and 102a in the order mentioned, the movable member 101 is moved backward macroscopically in the direction opposite to the direction denoted by the arrow 110.

In the electrostatic actuator of the construction described above, it is necessary to align the paired stationary members 102 and 103 with a high accuracy. It is also necessary to form equidistantly the electrodes of the same width in the stationary members 102 and 103 with a high accuracy. Such being the situation, a sufficient time and a sufficient labor are required for manufacturing the parts of the electrostatic actuator and for assembling the manufactured parts with a high accuracy. It follows that the manufacturing cost of the electrostatic actuator is increased, which generates a problem that must be solved for achieving mass production of the electrostatic actuator.

As described above, in the conventional electrostatic actuator, it is necessary to position accurately the two stationary members 102 and 103 and to set the phase of the alignment between the two with a high accuracy. It is also necessary to form accurately the electrodes on the two opposite surfaces of the movable member 101, with the result that a sufficient time and a sufficient labor are required for assembling the actuator mechanism. It follows that the manufacturing cost of the electrostatic actuator is increased so as to generate a problem that must be solved for achieving the mass production of the actuator mechanism.

BRIEF SUMMARY OF THE INVENTION

An object of the present invention is to provide an electrostatic actuator, which is driven by an electrostatic force and which permits increasing the electrostatic driving force while maintaining the capability of mass production, and a method of driving the electrostatic actuator.

According to a first aspect of the present invention, there is provided an electrostatic actuator, comprising:

a first stationary member provided with a first electrode group which includes at least three first stationary electrodes each having a first width and sequentially arranged at a first pitch in a predetermined direction;

a second stationary member arranged to face the first stationary member and provided with a second electrode group which includes at least three second stationary electrodes each having the first width and arranged at the first pitch in the predetermined direction;

a movable member configured to be movable in the predetermined direction, which is arranged between the first and second stationary members and is provided with first and second movable electrodes faced to the first and second stationary electrodes, respectively; and a signal generator configured to generate one of first and second voltage signals having different first and second timing patterns, respectively, and apply the one of the first and second voltage signals alternately to the first and second stationary electrodes, the movable member being driven in the predetermined direction in response to the one of the first and second voltage signals.

According to a second aspect of the present invention, there is provided an electrostatic actuator, comprising:

a first stationary member provided with a first electrode group which includes at least three first stationary electrodes each having first width and sequentially arranged at substantially the first pitch in a predetermined direction;

a second stationary member arranged to face the first stationary member and having a second stationary electrode;

a movable member configured to be movable in the predetermined direction, which is arranged between the first and second stationary members and is provided with first movable electrodes faced to the first electrode group and a second movable electrode faced the second stationary electrode; and a signal generator configured to generate first and second voltage signals and an auxiliary voltage signal, alternately apply the first voltage signal to at least one of the first stationary electrodes in a first period and the second voltage signal to the second stationary electrode in a second period, and apply the auxiliary voltage signal to at least one of the first stationary electrodes in the second period to drive the movable member in the predetermined direction.

According to a third aspect of the present invention, there is provided an electrostatic actuator, comprising:

a first stationary member provided with an electrode group which includes at least three first stationary electrodes each having a first width and sequentially arranged at a first pitch in a predetermined direction;

a second stationary member arranged to face the first stationary member and having a second stationary electrode;

a movable member configured to be movable in the predetermined direction, which is arranged between the first and second stationary members, and is provided with first movable electrodes faced the first stationary electrodes and a second movable electrode faced to the second stationary electrode; and a signal generator configured to generate first and second voltage signals and alternately apply the first and second voltage signals to the first and second stationary electrodes in first and second periods, respectively, the first period being longer than the second period.

According to a fourth aspect of the present invention, there is provided a method of driving an electrostatic actuator to move a movable member in a space between first and second stationary members in a predetermined direction, the first and second stationary members provided with first and second electrode groups which include at least three first and second stationary electrodes, respectively, the first and second stationary electrodes having a first width and sequentially arranged in a predetermined direction, and the movable member being provided with first and second movable electrodes faced to the first and second electrode groups, respectively, the driving method comprising:

generating a first voltage signal having a first timing pattern, and applying the first voltage signal to the first and second stationary electrodes, alternately;

generating a second voltage signal having a timing pattern different from the first voltage timing pattern, and applying the second voltage signal to the first and second stationary electrodes, alternately; and continuing the generating one of the first and second voltage signals and the applying of the one of the first and second voltage signals to the first and second stationary electrodes, alternately, in accordance to the movement of the movable member.

According to a fifth aspect of the present invention, there is provided a method of driving an electrostatic actuator to move a movable member in a space between first and second stationary members in a predetermined direction, the first and second stationary members provided with first electrode group including at least three first and second stationary electrodes, and a second stationary electrode, respectively, the first and second stationary electrodes having a first width and sequentially arranged in a predetermined direction, and the movable member being provided with first and second movable electrodes faced to the first electrode group and the second stationary electrode, respectively, the driving method comprising:

the driving method comprising:

generating first and second voltage signals and an auxiliary voltage signal and an auxiliary voltage signal, alternately applying the first voltage signal to at least one of the first stationary electrodes in a first period and the second voltage signal to the second stationary electrode in a second period, and applying the auxiliary voltage signal to at least one of the first stationary electrodes in the second period to drive the movable member in the predetermined direction.

Further, according to a sixth aspect of the present invention, there is provided a method of driving an electrostatic actuator to move a movable member in a space between first and second stationary members in a predetermined direction, the first and second stationary members provided with first electrode group including at least three first and second stationary electrodes, respectively, the first and second stationary electrodes having a first width and sequentially arranged in a predetermined direction, and the movable member being provided with first and second movable electrodes faced to the first and second electrode groups, respectively, the driving method comprising:

generating first and second voltage signals and alternately apply the first and second voltage signals to the first and second stationary electrodes in first and second periods, respectively, the first period being longer than the second period.

BRIEF DESCRIPTION OF THE SEVERAL VIEWS OF THE DRAWING

FIGS. 8A, 8B, 8C, 8D, 8E, 8F, 8G and 8H are timing charts collectively showing a pattern of the driving voltage for driving the electrostatic actuator having the electrode arrangement shown in FIG. 7;

FIGS. 10A, 10B, 10C, 10D, 10E, 10F, 10G and 10H are timing charts collectively showing a pattern of the driving voltage for driving the electrostatic actuator having the electrode arrangement shown in FIG. 9;

FIG. 11 is a graph showing the locus of the generated force in the case where the electrostatic actuator shown in FIG. 7 is driven by the driving voltage pattern shown in FIG. 8;

FIG. 12 is a graph showing the locus of the generated force in the case where the electrostatic actuator shown in FIG. 9 is driven by the driving voltage pattern shown in FIG. 10;

FIGS. 20A, 20B, 20C, 20D and 20E are timing charts collectively exemplifying a pattern of the driving voltage that permits the electrostatic actuator shown in FIG. 16 to generate a force in the horizontal direction as shown in FIG. 18;

FIGS. 22A, 22B, 22C, 22D and 22E are timing charts collectively showing a pattern of the driving voltage for driving the electrostatic actuator shown in FIG. 21;

DETAILED DESCRIPTION OF THE INVENTION

The electrostatic actuators according to various embodiments of the present invention will now be described in detail with reference to the accompanying drawings.

Figure 1:
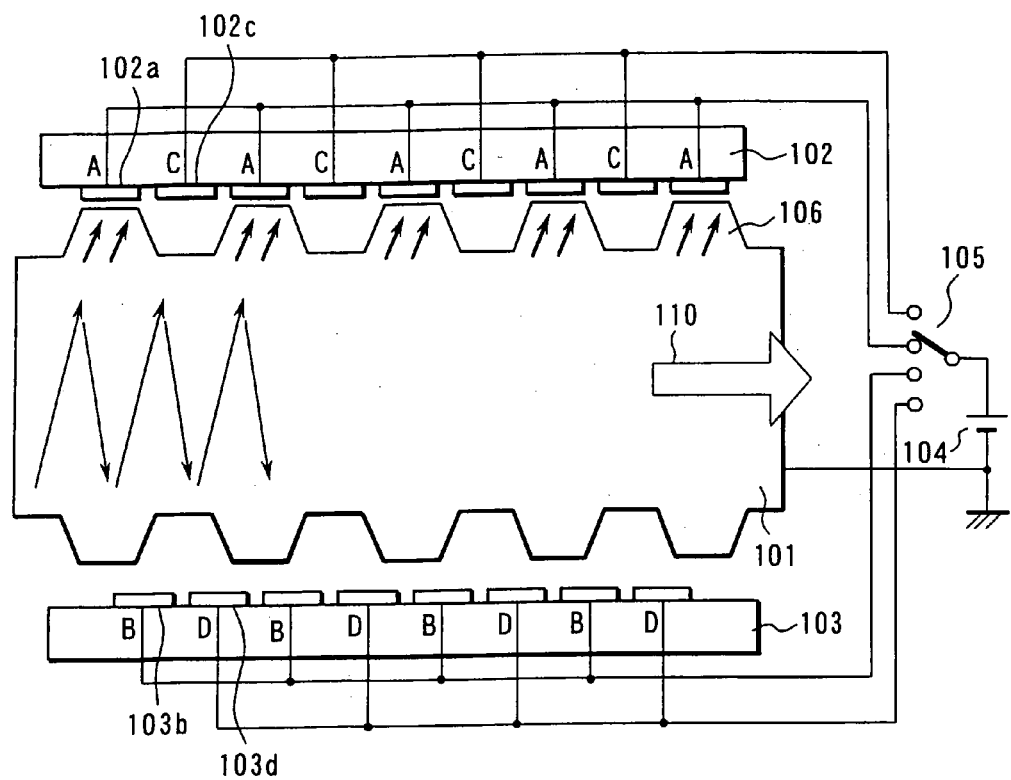
FIG. 1 schematically shows the construction of a conventional electrostatic actuator.
Figure 2:
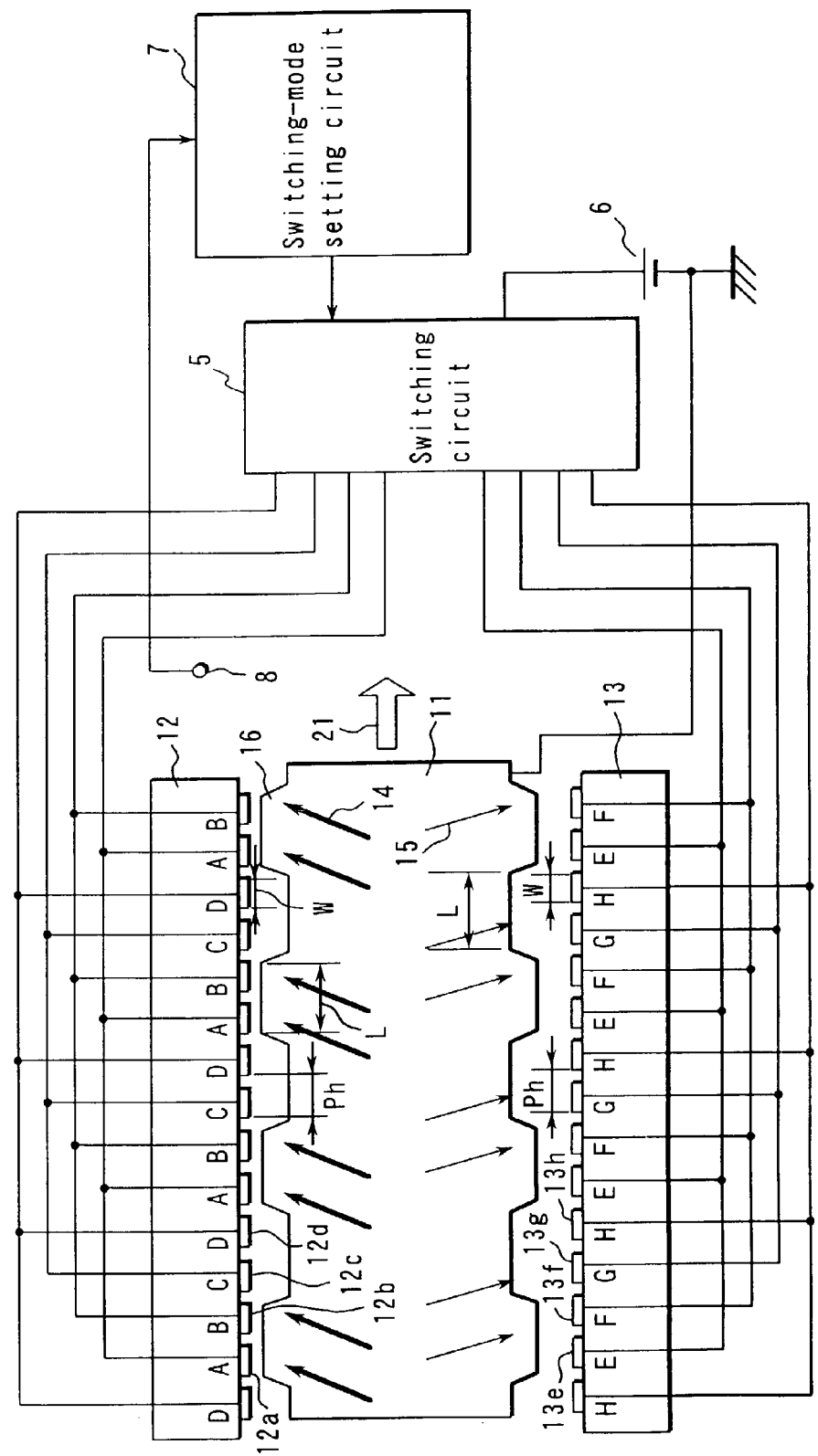
FIG. 2 schematically shows the construction of an electrostatic actuator according to one embodiment of the present invention.

FIG. 2 shows an electrostatic actuator according to one embodiment of the present invention, which is called an electrostatic actuator of a both side propelling driving type. In the both side propelling driving type electrostatic actuator, which is shown in FIG. 2, a movable member 11 that is to be driven is arranged in the space between two stationary members 12 and 13 that face each other. The movable member 11 is arranged slidable in the forward direction denoted by an arrow 21 or in the backward direction opposite to the forward direction denoted by the arrow 21. Electrode sections 16 are formed in the movable member 11. On the other hand, four stationary electrodes 12a, 12b, 12c and 12d, to which voltage is applied at a different timing, are arranged to form a group on the stationary member 12. A plurality of groups of these stationary electrodes is consecutively arranged along the arrow 21 on the stationary member 12. Likewise, four stationary electrodes 12e, 12f, 12g and 12h, to which voltage is applied at a different timing, are arranged to form a group on the stationary member 13. A plurality of groups of these stationary electrodes is also consecutively arranged along the arrow 21 on the stationary member 13. The system in which voltage is applied at a different timing to the four stationary electrodes is called a four electrode system or is simply called a four system. Incidentally, letters A, B, C, D, E, F, G and H indicate stationary electrodes 12a, 12b, 12c, 12d, 13e, 13f, 13g and 13h, respectively, for convenience' sake in the description. Also, these stationary electrodes are referred to in the following description as, for example, stationary electrode A (12a) or simply as electrode B (12b) in some cases. In the four electrode system shown in FIG. 2, these stationary electrodes 12a, 12b, 12c, 12d, 13e, 13f, 13g and 13h are formed in substantially the same pitch Ph on the stationary members 12 and 13. Also, these stationary electrodes are substantially equal to each other in the width. Also, the movable electrodes 16 are formed at a pitch 4 Ph on the movable member 11 in a manner to face the stationary electrodes 12a, 12b, 12c, 12d and the stationary electrodes 13e, 13f, 13g, 13h. The width L of the movable electrode 16 is set at a level 1.5 to 2.5 times as much as the width W of each of the stationary electrodes 12a, 12b, 12c, 12d and the stationary electrodes 13e, 13f, 13g, 13h. Also, the stationary electrodes 12a, 12b, 12c, 12d and the stationary electrodes 13e, 13f, 13g, 13h are arranged to cover a range over which the movable member 11 is moved, and each of the movable electrodes 16 is positioned to face two adjacent electrodes included in the stationary electrodes 12a, 12b, 12c, 12d and the stationary electrodes 13e, 13f, 13g, 13h. It should also be noted that it is possible for the stationary electrodes 12a, 12b, 12c, 12d to be positioned simply to face the stationary electrodes 13e, 13f, 13g, 13h when the electrostatic actuator is assembled. In other words, the electrostatic actuator of the present invention shown in FIG. 2 differs from the conventional electrostatic actuator in that the stationary electrodes 12a, 12b, 12c, 12d need not be aligned with the stationary electrodes 13e, 13f, 13g, 13h when the electrostatic actuator is assembled. Where the stationary electrodes 12a, 12b, 12c, 12d and the stationary electrodes 13e, 13f, 13g, 13h are arranged to achieve an alignment in the phase of the arrangement, it is possible for the phase of the arrangement to be deviated within a range of ½ phase or within a range of between 0 and ½ phase. It should be noted that where the stationary electrodes 12a, 12b, 12c, 12d and the stationary electrodes 13e, 13f, 13g, 13h are arranged to face each other, the deviation ΔP in the phase between the stationary electrodes 12a, 12b, 12c, 12d of the stationary member 12 and the stationary electrodes 13e, 13f, 13g, 13h of the stationary member 13 falls within a small range of between 0 and Ph/2 pitch, i.e., $0 \leq \Delta P \leq Ph/2$.

Figure 3:
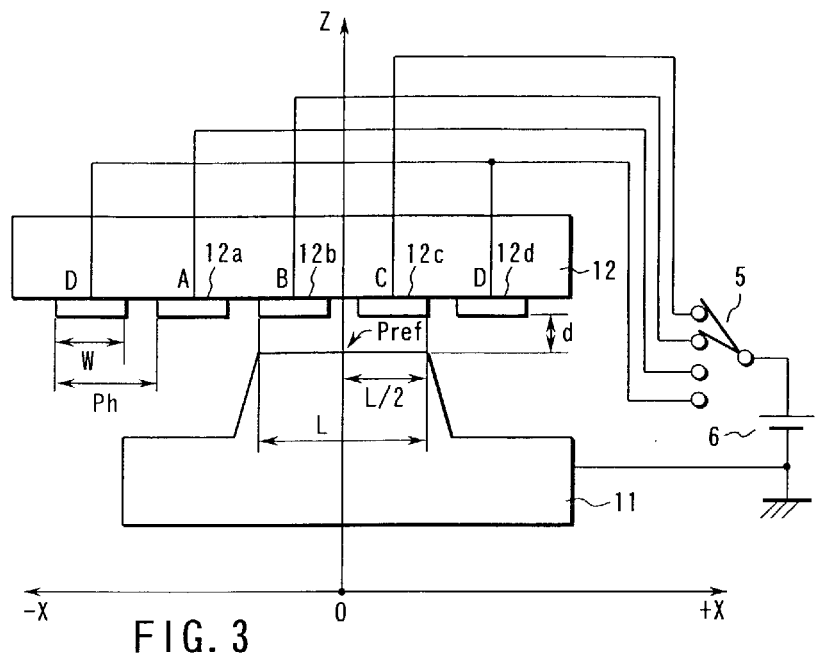
FIG. 3 is a magnified view schematically showing the operation of the electrostatic actuator shown in FIG. 2.

In the electrostatic actuator shown in FIG. 2, it is possible for the movable electrode 16 to have a positional relationship with the stationary electrodes 12a, 12b, 12c, 12d as shown in FIG. 3. If voltage is applied in this case from a voltage source 6 to the stationary electrodes 12b and 12c through a switching circuit 5, an electrostatic force, i.e., the Coulomb force, is generated between the stationary electrodes 12b, 12c and the movable electrode 16, with the result that the movable member 11 is attracted toward the stationary member 12 such that the stationary electrodes 12b, 12c are allowed to overlap with the movable electrode 16. Then, when the switching circuit 5 is switched from the stationary electrodes 12b, 12c to the stationary electrodes 13f, 13g so as to apply voltage to the stationary electrodes 13f, 13g or 13g, 13h, the movable member 11 is attracted toward the other stationary member 13 such that the movable electrode 16 is allowed to overlap with the stationary electrodes 13f, 13g or 13g, 13h. Also, when the switching circuit 5 is switched from the stationary electrodes 13f, 13g or 13g, 13h to the stationary electrodes 12c, 12d so as to apply voltage to the stationary electrodes 12c, 12d, the movable member 11 is attracted toward the stationary member 12 such that the movable electrode 16 is allowed to overlap with the stationary electrodes 12c, 12d. Further, when the switching circuit 5 is switched to apply voltage to electrodes of the other stationary member 13, the movable member 11 is attracted toward the other stationary member 13. If voltage, which is successively switched, is applied to the electrodes of the stationary members as described above, the movable member 11 is macroscopically moved forward as denoted by the arrow 21 in FIG. 2 while being vibrated microscopically between the stationary members 12 and 13. If the order of the voltage application is reversed, the movable member 11 is driven in the backward direction, which is opposite to the direction denoted by the arrow 21 in FIG. 2.

Described in the following with reference to FIGS. 3 to 6 is the relationship between the position of the movable electrode 16 and the force generated in the vertical direction and the horizontal direction (moving direction) between the movable electrode 16 and the four system electrodes 12a, 12b, 12c, 12d formed on the stationary member 12 in respect of the electrostatic actuator shown in FIG. 2.

The generated force imparted to the movable electrode 16, which has a vector component Fz in the vertical direction and a vector component Fy in the horizontal direction (moving direction), is represented by formulas (1) and (2) given below, if each of the movable electrode 16 and the electrodes 12a, 12b, 12c, 12d formed on the stationary member 12 is assumed to be a flat electrode having no thickness:

$$Fz = n \times \in (SV^2/2d^2) \quad (1)$$

$$Fy = n \times \in (MV^2/2d) \quad (2)$$

where "n" represents the number of projecting electrodes 16 formed in the movable member 11, "∈" represents the dielectric constant between the movable electrode 16 of the movable member 11 and each of the electrodes 12a, 12b, 12c, 12d formed on the stationary member 12, "M" represents the depth distance, i.e., the length in the direction perpendicular to the moving direction of the movable member, in the case where the movable electrode 16 overlaps with some of the stationary electrodes 12a, 12b, 12c, 12d or represents 0 in the case where there is no overlapping, "S" represents the area of the portion where the movable electrode and the stationary electrodes are positioned to face each other, "V" represents the voltage applied between the electrodes, and "d" represents the distance between the electrodes. The distance "d" corresponds to the gap between the movable electrode 16 and the stationary electrode shown in FIG. 3.

To be more specific, the dielectric constant ∈ is represented by the value obtained by multiplying the dielectric constant of vacuum by the relative dielectric constant of a certain substance present between the movable member 11 and each of the electrodes 12a, 12b, 12c, 12d formed on the stationary member 12. The dielectric constant $\in_0$ of vacuum is $8.85 \times 10^{-12}$ [N/m]. On the other hand, the relative dielectric constant of, for example, the air is about 1, and the relative dielectric constant of polyimide used for insulation of, for example, an electrode is about 3.

Figure 4:
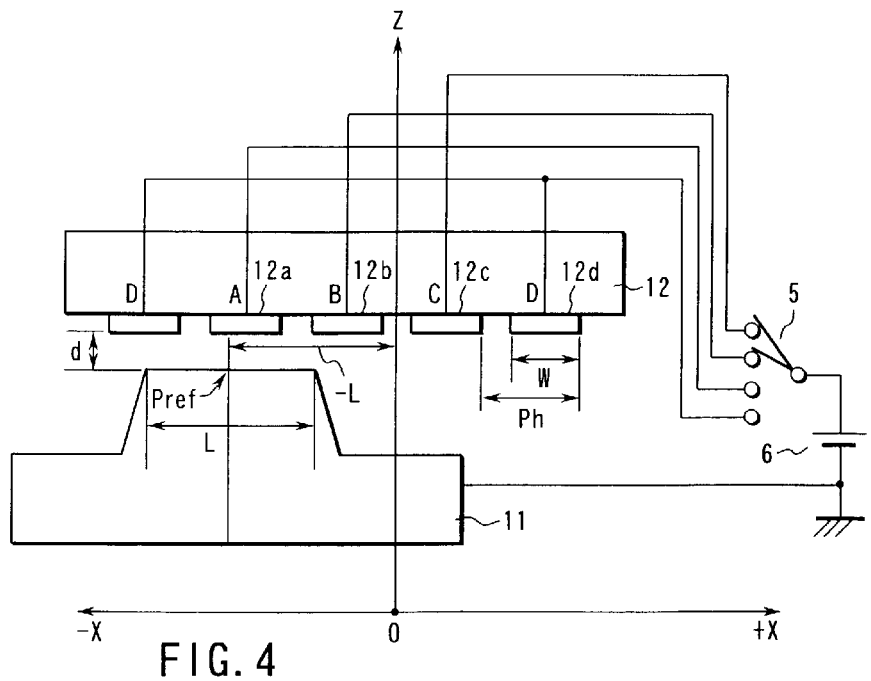
FIG. 4 is a magnified view schematically showing the operation of the electrostatic actuator shown in FIG. 2.
Figure 5:
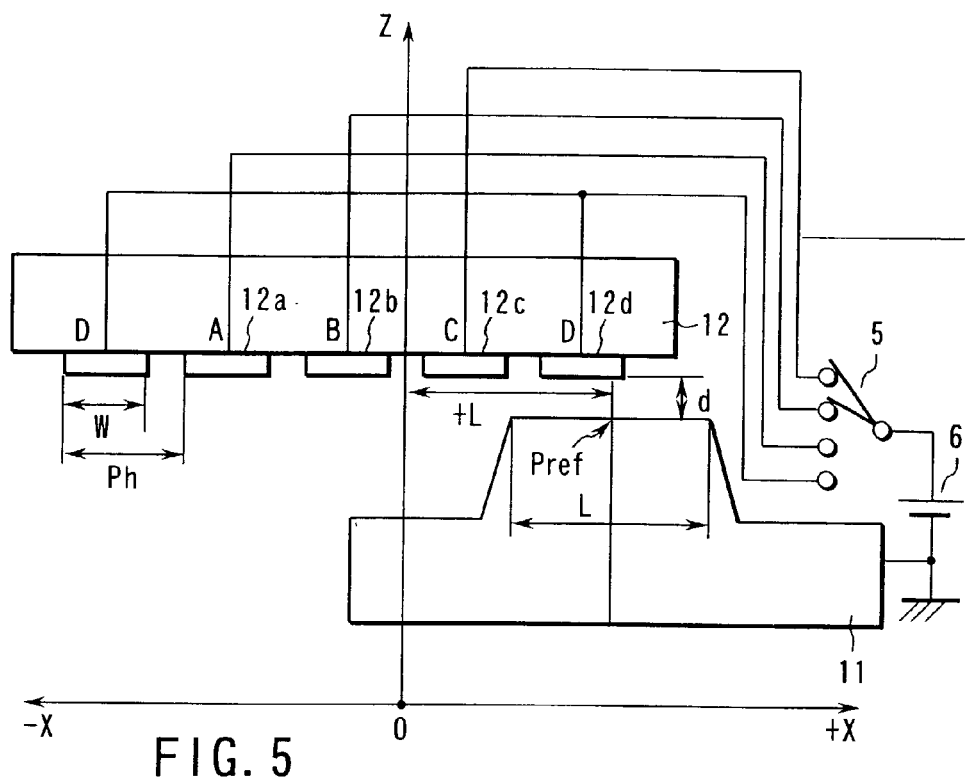
FIG. 5 is a magnified view schematically showing the operation of the electrostatic actuator shown in FIG. 2.

"M" in formula (2) given above is represented by a binary value consisting of the depth distance noted above and 0. FIG. 3 shows the state that the stationary electrodes 12b and 12c are allowed to overlap with the movable electrode 16. On the other hand, each of FIGS. 4 and 5 shows the state that the stationary electrodes 12b and 12c are not allowed at all to overlap with the movable electrode 16. As described herein later, the overlapping depth distance M is changed in accordance with the change from the state shown in FIG. 4 to the state shown in FIG. 3 or from the state shown in FIG. 3 to the state shown in FIG. 5.

Further, "S" in formula (1) given above represents the area of the portion where the movable electrode faces the stationary electrodes, as described above. It should be noted that a single stationary electrode has a width W in the horizontal moving direction of the movable member 11, and a single movable electrode 16 has a width L in the horizontal moving direction of the movable member 11. The area S is equal to M×R, where R represents the width (overlapping length of the movable member in the moving direction) of the stationary electrode and the movable electrode positioned to face each other. In the electrode arrangements shown in FIGS. 3 to 5, M has a relationship of $0 \leq R \leq 2W$.

As described previously, the formulas (1) and (2) given above are directed to a model covering the case where the thickness direction of the electrode is neglected. In other words, neglected are the influence in the depth direction of the movable member 11, i.e., the tapered side surfaces of the protruding movable electrode 16 shown in FIG. 2, and the influences among the electrodes 12a, 12b, 12c, 12d formed on the stationary member 12. However, it is practically necessary to take these influences into consideration. The necessity for the consideration will be described herein later.

The definition of the coordinate (X-Z) in FIGS. 3 to 6 will now be described. The center between the stationary electrodes 12b and 12c of the stationary member 12 is made the origin (X=0), and the left side on the paper is minus (−X) and the right side on the paper is plus (+X). On the other hand, the center point $P_{ref}$ of the protruding electrode 16 of the movable member 11 is used as a reference point. The displacement between the stationary member 12 and the movable member 11 denotes the change in the reference point $P_{ref}$ of the movable member 11 relative to the origin (X=0), and the change in the minus or plus direction is as described above. Incidentally, this is also the case with the minus or plus of the generated force in the horizontal direction. Incidentally, formulas (1) and (2) given previously denote the magnitude alone of the generated force and do not denote the acting direction of the generated force.

The following description covers the case where voltage is applied to the electrodes 12b and 12c of the stationary member 12.

Formulas (1) and (2) given previously indicate that, if the displacement of the movable member 11 is not smaller than −L as shown in FIG. 4, the protruding electrode 16 of the movable member 11 and the stationary electrode 12b do not face each other even if these electrodes 16 and 12b are positioned in parallel. As a result, an overlapping parallel plate portion is not included in the arrangement of the movable member 11 and the stationary member 12. It follows that each of S in formula (1) and M in formula (2) becomes 0 and, thus, each of the generated force Fz in the vertical direction and the generated force Fy in the horizontal direction (moving direction) also becomes zero.

Where the displacement of the movable member 11 falls within a range of between −L and 0, the generated force Fy in the horizontal direction (moving direction) is rendered constant regardless of the position of the movable member 11. It should be noted in this connection that the component R noted above (i.e., the overlapping amount between the protruding electrode 16 of the movable member 11 and the stationary electrode) is not included in formula (2) denoting the generated force Fy in the horizontal direction (moving direction) and, thus, M in formula (2) assumes a binary value of zero or a constant value in respect of the overlapping. Incidentally, the direction of the generated force is on the plus side, i.e., the direction of +X. Also, the generated force Fz in the vertical direction is increased with increase in the overlapping amount in the horizontal direction between the protruding electrode 16 of the movable member 11 and the stationary electrode, i.e., with increase in R. The overlapping amount is rendered maximum when the displacement of the movable member 11 is exactly zero and, thus, the generated force Fz in the vertical direction is rendered maximum. FIG. 3 shows the state that the displacement of the movable member 11 is zero.

The generated force Fy in the horizontal direction (moving direction) is constant and the direction of the force is reversed to minus regardless of the position of the movable member 11 in also the case where the displacement of the movable member 11 falls within a range of between 0 and +L. The reasons for the particular situation are as described above. Incidentally, the generated force Fz in the vertical direction is decreased with decrease in the overlapping amount, i.e., decrease in R. If the displacement of the movable member 11 exceeds L, there is no overlapping amount and, thus, each of the generated force Fz in the vertical direction and the generated force in the horizontal direction (moving direction) is rendered zero, as described previously. FIG. 5 shows the state that the displacement of the movable member 11 is +L.

To be more specific, the generated force Fy in the horizontal direction (moving direction) is changed to depict a rectangular wave form such that the generated force Fy is zero if the displacement of the movable member 11 is smaller than −L, the generated force Fy is changed to a plus constant value if the displacement of the movable member 11 falls within a range of between −L and 0, the generated force Fy is changed to a minus constant value if the displacement of the movable member 11 falls within a range of between 0 and +L, and the generated force Fy is changed again to zero if the displacement of the movable member 11 is larger than +L. However, in practice, the generated force is not instantly changed from zero to a constant value, but is changed gradually. The gradual change is based on the influences given by the component in the thickness direction of each electrode, which is neglected in each of formulas (1) and (2) given previously. The generated force in the gradually changed portion greatly affects the driving of the actuator and, thus, cannot be neglected in practice.

Figure 6:
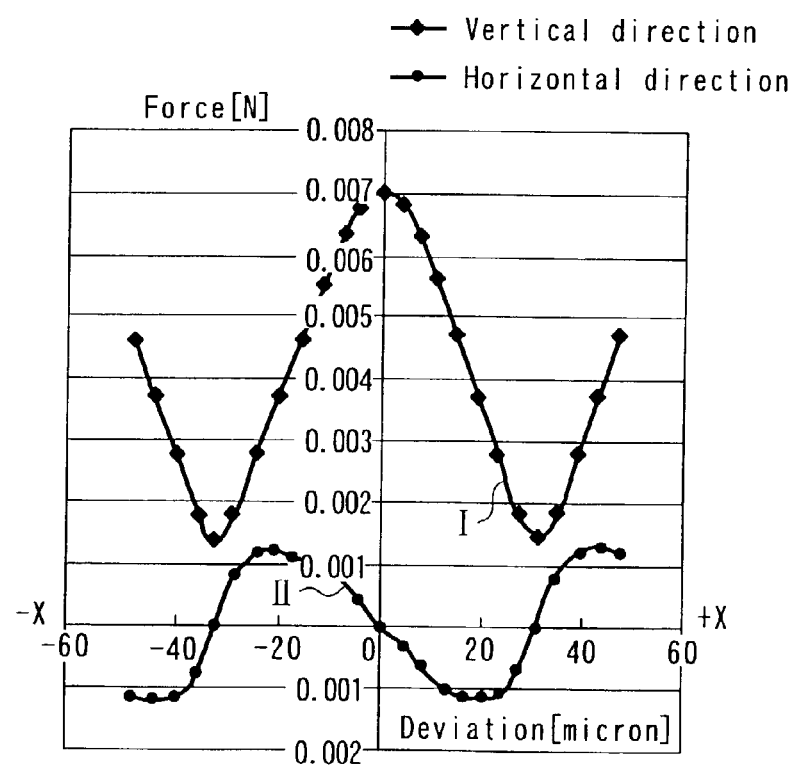
FIG. 6 is a graph showing the relationship between the deviation of the movable member and the driving force in the horizontal direction and the vertical direction in respect of the electrostatic actuator shown in FIG. 3.

The generated force in which the component in the thickness direction is taken into account will now be described. FIG. 6 is a graph showing the changes obtained by a finite-element method in the generated force Fz and the generated force Fy in respect of the positional relationship between the protruding electrode 16 of the movable member 11 and each of the electrodes 12a, 12b, 12c, 12d formed on the stationary member 12. The positional relationship is as in the coordinate system defined above.

Curve I in FIG. 6, which is plotted by rectangular marks, corresponds to the generated force Fz in the vertical direction, and curve II plotted by circular marks corresponds to the generated force Fy in the horizontal direction (moving direction). The force (unit of N) is plotted on the ordinate, and the positional relationship between the movable electrode 16 of the movable member 11 and the stationary electrodes B (12b), C (12c) formed on the stationary member 2 is plotted on the abscissa in terms of the deviation (μm).

Concerning the size of the electrostatic actuator for obtaining the data given in the graph of FIG. 6, the dimension is determined on the assumption that the electrostatic actuator is used in a mobile device such as a portable telephone as a camera module, as described herein later. For example, the gap d is 7.8 μm, the width w of the stationary electrode is 12 μm, the pitch Ph is 16 μm, the width L of the protruding electrode 16 formed in the movable member 11 is 28 μm, and the number of movable electrodes 16 is 94. As apparent from the graph of FIG. 6, the generated force Fy in the horizontal direction (moving direction) is gradually changed immediately before and after the protruding movable electrode 16 of the movable member 11 overlaps with and is moved away from the stationary electrode B (12*b*), which clearly differs from the model given by formulas (1) and (2) in which the thickness is neglected.

Incidentally, in the following description of the driving method, the generated force in the horizontal direction (moving direction) is replaced by a sine wave form joining the 0-point and the maximum value for the sake of brevity. In the graph of FIG. 6, the voltage V applied to the stationary electrodes 12*b*, 12*c* is a value calculated on the basis of 100V.

In the electrostatic actuator according to this embodiment of the present invention, a switching mode setting circuit 7 for designating one of a first voltage pattern VP1 and a second voltage pattern VP2, which are described herein later, is arranged as shown in FIG. 2 in view of the characteristics shown in FIG. 6 so as to apply an appropriate voltage pattern selected from the first voltage pattern VP1 and the second voltage pattern VP2 to the stationary electrodes 12*a*, 12*b*, 12*c*, 12*d* and the stationary electrodes 13*e*, 13*f*, 13*g*, 13*h* depending on the arrangement of the stationary electrodes 12*a*, 12*b*, 12*c*, 12*d* and the stationary electrodes 13*e*, 13*f*, 13*g*, 13*h* mounted to the electrostatic actuator. To be more specific, where the positions of the stationary electrodes 12*a*, 12*b*, 12*c*, 12*d* and the stationary electrodes 13*e*, 13*f*, 13*g*, 13*h* are substantially aligned in assembling the electrostatic actuator as denoted by a broken line 50 shown in FIG. 7 and, thus, the deviation ΔP between the corresponding electrodes, e.g., between the stationary electrode A (12*a*) and the stationary electrode E (12*e*), is substantially zero or is sufficiently small, i.e., 0≦|ΔP|≦Ph/4, the corresponding stationary electrodes are regarded as being in phase and, thus, the first voltage pattern VP1 shown in FIG. 8 is applied to the stationary electrodes 12*a*, 12*b*, 12*c*, 12*d* and the stationary electrodes 13*e*, 13*f*, 13*g*, 13*h*. On the other hand, where a positional deviation ΔP is generated in assembling the electrostatic actuator between the stationary electrodes 12*a*, 12*b*, 12*c*, 12*d* and the stationary electrodes 13*e*, 13*f*, 13*g*, 13*h* as denoted by a broken line 52 in FIG. 9 and, thus, the deviation ΔP between the corresponding electrodes, e.g., between the stationary electrode A (12*a*) and the stationary electrode E (12*e*), is substantially equal to Ph/2 or is sufficiently close to Ph/2, i.e., Ph/2≦|ΔP|≦Ph/4, it is understood that there is a phase difference of Ph/2 between the corresponding stationary electrodes and, thus, the voltage pattern VP2 shown in FIG. 10 is applied to the stationary electrodes 12*a*, 12*b*, 12*c*, 12*d* and the stationary electrodes 13*e*, 13*f*, 13*g*, 13*h*.

The operation of the electrostatic actuator according to this embodiment of the present invention will now be described more in detail with reference to FIGS. 7 to 12.

Figure 7:
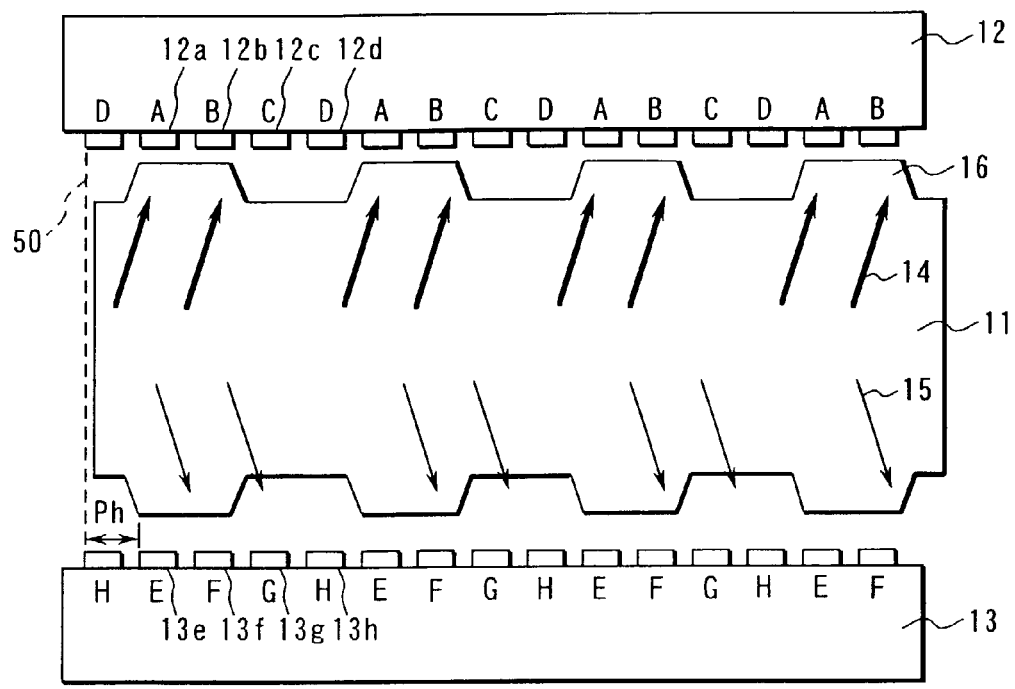
FIG. 7 shows an example of the arrangement of the stationary electrodes which are arranged with the phase substantially aligned in the electrostatic actuator shown in FIG. 2.
Figure 9:
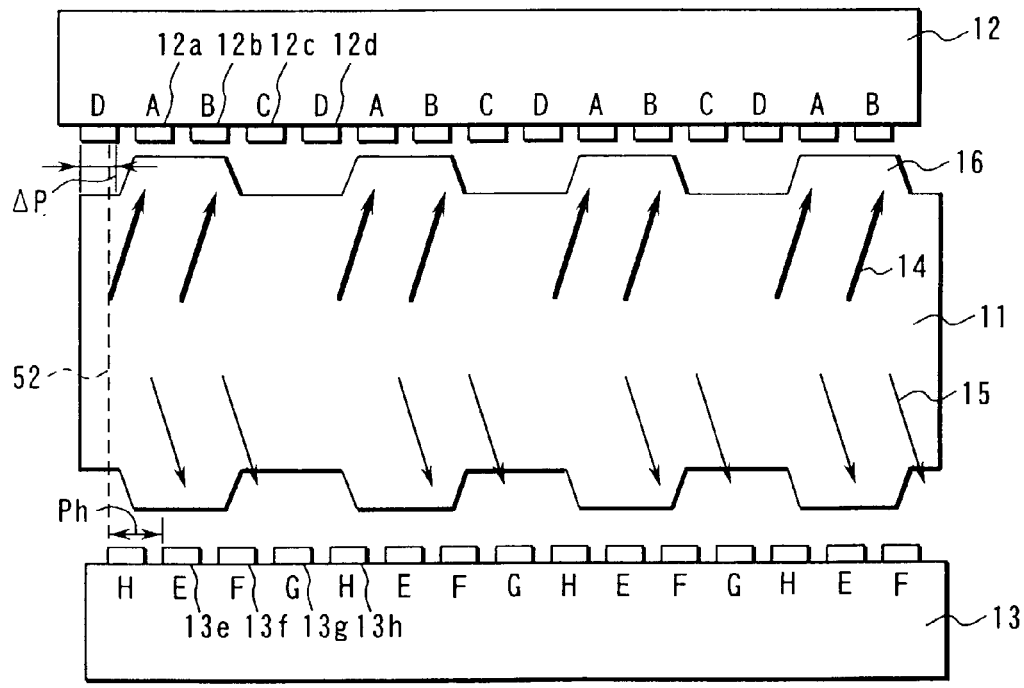
FIG. 9 shows an example of the arrangement of the stationary electrodes which are arranged deviant by ½ phase in the electrostatic actuator shown in FIG. 2.

FIG. 7 shows the positional relationship that permits the stationary electrodes 12*a*, 12*b*, 12*c*, 12*d* to overlap with the stationary electrodes 13*e*, 13*f*, 13*g*, 13*h* without giving rise to a deviation. In the particular positional relationship, the phase difference between the stationary electrodes 12*a*, 12*b*, 12*c*, 12*d* and the stationary electrodes 13*e*, 13*f*, 13*g*, 13*h* is substantially zero. FIG. 9 shows the positional relationship that permits producing the largest phase difference between the stationary electrodes 12*a*, 12*b*, 12*c*, 12*d* and the stationary electrodes 13*e*, 13*f*, 13*g*, 13*h*. In the particular positional relationship, the phase difference relating to the arrangement of the stationary electrodes 13*e*, 13*f*, 13*g*, 13*h* relative to the arrangement of the stationary electrodes 12*a*, 12*b*, 12*c*, 12*d* is ½ and the deviation ΔP thereof is Ph/2.

In the arrangement having a phase difference of zero as shown in FIG. 7, voltage is applied first to the stationary electrode A (12*a*) formed in the stationary member 12 as shown in FIGS. 8A and 8B. As described previously, an attractive force 14 is exerted on the movable member 11 so as to drive the protruding electrode 16 of the movable member 11 in a manner to overlap with the stationary electrodes A (12*a*) and B (12*b*). Then, voltage is applied to not only the stationary electrodes E (12*e*) and F (12*f*), which exactly face the stationary electrodes A (12*a*) and B (12*b*), respectively, but also the stationary electrodes F (12*f*) and G (13*g*), which are positioned away from the stationary electrodes A (12*a*) and B (12*b*) in the moving direction by one pitch Ph, as shown in FIGS. 8F and 8G. By the application of the voltage to the stationary electrodes F (12*f*) and G (13*g*), an attractive force 15 is similarly exerted so as to drive the protruding electrode 16 of the movable member 11 in a manner to overlap with the stationary electrodes F (12*f*) and F (13*f*). Likewise, voltage is applied to the stationary electrodes B (12*b*) and C (12*c*) formed on the stationary member 12, as shown in FIGS. 8B and 8C, followed by applying voltage to the stationary electrodes G (13*g*) and H (13*h*), as shown in FIGS. 8G and 8H. Also, voltage is applied to the stationary electrodes C (12*c*) and D (13*d*) formed on the stationary member 12, as shown in FIGS. 8C and 8D, followed by applying voltage to the stationary electrodes H (13*h*) and E (12*e*), as shown in FIGS. 8H and 8E. Further, voltage is applied to the stationary electrodes D (13*d*) and A (12*a*) formed on the stationary member 12, as shown in FIGS. 8D and 8A, followed by applying voltage to the stationary electrodes E (12*e*) and F (12*f*), as shown in FIGS. 8E and 8F. If the voltage application pattern of one cycle described above is repeated, the movable member 11 is macroscopically driven forward to the right on the paper while being microscopically vibrated in the up-down direction. As apparent from the description given above, the movable member 11 is driven backward to the left on the paper, if the order of the voltage pattern applied to the stationary electrodes 12*a*, 12*b*, 12*c*, 12*d*, 13*e*, 13*f*, 13*g*, 13*h* is reversed.

If attentions are paid to the generated force Fy in the individual electrode sections described previously in the arrangement having a phase difference of 0 shown in FIG. 7, the driving operation of the movable member 11 is as shown in the graph of FIG. 11.

In the graph of FIG. 11, the position of the movable member 11 in the horizontal direction (moving direction) relative to the stationary member 12 is plotted on the abscissa. On the other hand, the generated force in the moving direction when the movable member 11 is positioned in each of the relative positions is plotted on the ordinate. Incidentally, the description of AB phase, DA phase, etc. along the abscissa denotes that voltage is applied to the electrodes corresponding to the symbols shown in FIG. 7. In the case of, for example, the AB phase, it is denoted that voltage as shown in FIG. 8 is applied to the stationary electrodes A (12*a*) and B (12*b*).

The definition of the coordinate will now be described. The center between the stationary electrodes A (12*a*) and B (12*b*) is used as the origin 0, and left side on the paper denotes minus and the right side on the paper denotes plus, as shown in FIG. 3. On the other hand, the center point $P_{ref}$ of the protruding electrode 16 is used as a reference in the movable member 11. The position of the movable member 11 relative to the stationary member 12 represents the displacement from the reference point $P_{ref}$ and the origin 0, and the plus-minus relationship is as described above.

The following description covers an example in which the voltage application is switched from the AB phase (voltage application to the stationary electrodes A (12a) and B (12b)) to the FG phase (voltage application to the stationary electrodes F (12f) and G (13g)). When voltage is applied to the stationary electrodes A (12a) and B (12b), the generated force Fy in the horizontal direction has a sine wave form having the maximum value at the position of −16 μm. It should be noted that the generated force is zero in each of the position of −32 μm and the position of 0 μm. However, the position of −32 μm differs from the position of 0 μm in the significance, though the generated force is zero in each of these positions.

The position of −32 μm denotes the state that the protruding electrode 16 of the movable member 11 is positioned to face exactly the stationary electrodes C (12c) and D (13d). If voltage is applied to the stationary electrodes A (12a) and B (12b) under this state, the protruding electrode 16 of the movable member 11 receives a generated force corresponding to the deviation of −32 μm shown in FIG. 65 on the plus side from the AB phase (stationary electrodes A (12a) and B (12b)) positioned forward in the moving direction. On the other hand, the protruding electrode 16 of the movable member 11 receives a generated force corresponding to the deviation of +32 μm shown in FIG. 6 on the minus side from the AB phase positioned backward in the moving direction. It follows that the generated force on the plus side is offset with the generated force on the minus side so as to permit the generated force to be zero. On the other hand, the position of 0 μm denotes the state that the protruding electrode 16 of the movable member 11 is positioned to face the stationary electrodes A (12a) and B (12b). If voltage is applied to the AB phase under this state, the generated force corresponds to the case where the deviation shown in FIG. 6 is 0 μm, and the generated force in the horizontal direction is zero.

On the other hand, the generated force in the case of applying voltage to the stationary electrodes F (12f) and G (13g) is represented by a sine wave having the maximum value at the origin 0. The switching of the electrodes to which voltage is applied from the stationary electrodes A (12a) and B (12b) to the stationary electrodes F (12f) and G (13g) denotes the change in the generated force Fy along the solid line leading from the AB phase to the FG phase plotted on the abscissa of the graph shown in FIG. 11. It is seen from FIG. 11 that, if the electrodes are arranged as shown in FIG. 7, i.e., if the phase difference between the stationary electrodes 12a, 12b, 12c, 12d and the stationary electrodes 13e, 13f, 13g, 13h is zero, the minimal values of the generated force are the same and are small in fluctuation. Incidentally, where the movable member 11 is actually attracted by the stationary electrodes A (12a) and B (12b), the distance d, which corresponds to the gap shown in FIG. 3, between the movable member 11 and the stationary electrodes A (12a), B (12b) of the stationary member 12 is changed, and the generated force Fy in the moving direction is increased in accordance with the change in the distance denoted above because the generated force is inversely proportional to the distance d. It follows that the curve denoting the generated force is rendered more complex. Such being the situation, the minimum value of the generated force Fy in the moving direction is used in the following description in view of the safety.

The operation of the electrostatic actuator having the electrode arrangement in which the phase difference is ½ will now be described with reference to FIG. 9. In the arrangement shown in FIG. 9, it is assumed that voltage is applied first to the stationary electrodes A (12a) and B (12b) formed on the stationary member 12, as shown in FIGS. 10A and 10B. As a result, the attractive force 14 is exerted on the movable member 11 so as to drive the movable member 11 in a manner to permit the protruding electrode 16 of the movable member 11 to overlap with the stationary electrodes A (12a) and B (12b), as described previously. Then, voltage is applied to the stationary electrodes E (12e) and F (12f), which are positioned away from the stationary electrodes A (12a) and B (12b) in the moving direction by a half pitch Ph/2, as shown in FIGS. 10E and 10F. By the voltage application to the stationary electrodes E (12e) and F (12f), the attractive force 15 is similarly exerted on the movable member 11 so as to drive the movable member 11 such that the protruding electrode 16 of the movable member 11 is allowed to overlap with the stationary electrodes E (12e) and F (12f). Likewise, voltage is applied to the stationary electrodes B (12b) and C (12c) formed on the stationary member 12 as shown in FIGS. 10B and 10C, followed by applying voltage to the stationary electrodes F (12f) and G (13g) as shown in FIGS. 10F and 10G. Also, voltage is applied to the stationary electrodes C (12c) and D (13d) formed on the stationary member 12 as shown in FIGS. 10C and 10D, followed by applying voltage to the stationary electrodes and G (13g) and H (13h) as shown in FIGS. 10G and 10H. Further, voltage is applied to the stationary electrodes D (13d) and A (12a) formed on the stationary member 12 as shown in FIGS. 10D and 10A, followed by applying voltage to the stationary electrodes H (13h) and E (12e) as shown in FIGS. 10H and 10E. If the voltage application pattern of one cycle described above is repeated, the movable member 11 is macroscopically driven forward to the right on the paper while being microscopically vibrated in the up-down direction. As apparent from the description given above, the movable member 11 is driven backward to the left on the paper, if the order of the voltage pattern applied to the stationary electrodes 12a, 12b, 12c, 12d, 13e, 13f, 13g, 13h is reversed.

FIG. 12 shows the driving operation of the movable member 11 described previously with the attentions paid to the generated force Fy in the individual electrode sections described previously. To be more specific, if the second voltage pattern VP2 shown in FIG. 10 is applied to the stationary electrodes 12a, 12b, 12c, 12d, 13e, 13f, 13g, 13h, the phase difference between the movable member 11 and each of the stationary electrodes 12a, 12b, 12c, 12d, 13e, 13f, 13g, 13h causes the generated force to become as shown in FIG. 12. When it comes to an example in which the voltage application is switched from the AB phase (i.e., voltage application to the stationary electrodes A (12a) and B (12b)) to the EF phase (i.e., voltage application to the stationary electrodes E (12e) and F (12f)), the semi-arc denoting the generated force of the EF phase is deviated by 8 μm to the left on the paper because the stationary electrodes E (12e) and F (12f) are deviated from the stationary electrodes A (12a) and B (12b) by half the electrode pitch of, for example, 16 μm, i.e., deviated by 8 μm. If the portion of the force generated in the movable member 11 is denoted by a solid line, the situation is as shown in FIG. 12. If compared with the graph shown in FIG. 11, it can be understood that the change in the generated force (force gap) is large and that the minimum value is lowered. However, the force Fy is kept generated in the moving direction.

As described previously, the phase difference relating to the arrangement of the stationary members 12 and 13 falls within a range of between 0 (minimum) and the half phase (maximum). Therefore, if the first voltage pattern PV1 and the second voltage pattern PV2 are generated from the switching circuit 5, the electrostatic actuator is driven by any of the voltage patterns. To be more specific, the force Fy is kept generated in the moving direction so as to drive the movable member 11 even if the positions of the stationary members 12 and 13 are not aligned. It follows that it is possible to judge which of the driving voltage pattern VP1 or VP2 to apply is appropriate by applying first the first and second driving voltage patterns VP1 and VP2 to the stationary electrodes at a different timing. For example, it is possible to mount a position sensor 8 for detecting the movement of the movable member 11 in the electrostatic actuator as shown in FIG. 2, to detect which of the first and second driving voltage patterns VP1 and VP2 served to drive the movable member 11 by the position sensor 8, and to allow the switching mode setting circuit 7 to designate one of the first and second driving voltage patterns in response to the output from the position sensor 8.

The electrostatic actuator shown in FIG. 2 is of a four system type in which voltage is applied to four stationary electrodes at a different timing. However, it is also possible to apply the technical idea of the present invention to an electrostatic actuator of a three system type shown in FIG. 13 in which voltage is applied to three stationary electrodes at a different timing.

Figure 13:
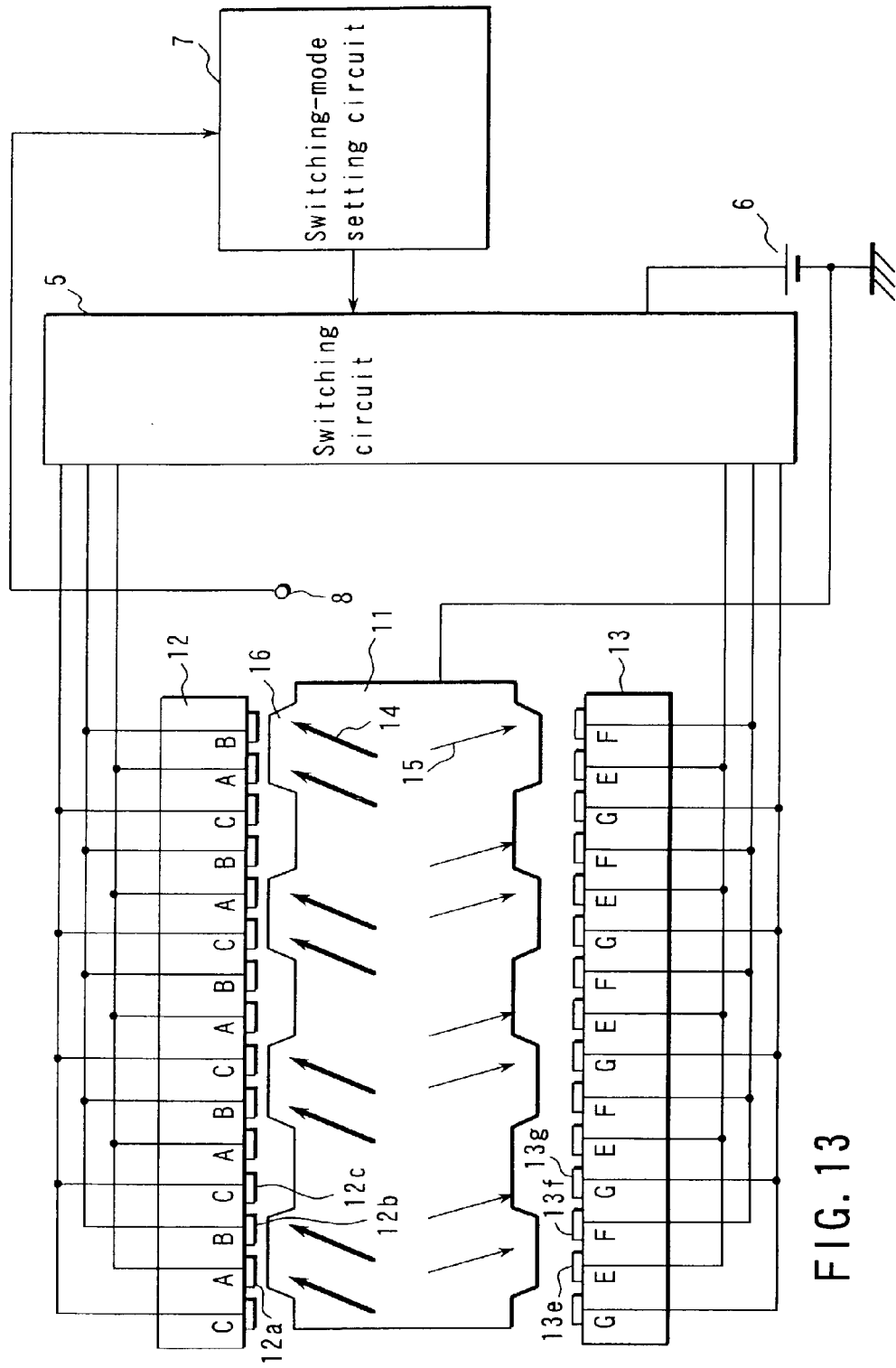
FIG. 13 schematically shows the construction of the electrostatic actuator according to the modified embodiment shown in FIG. 2.
Figure 14:
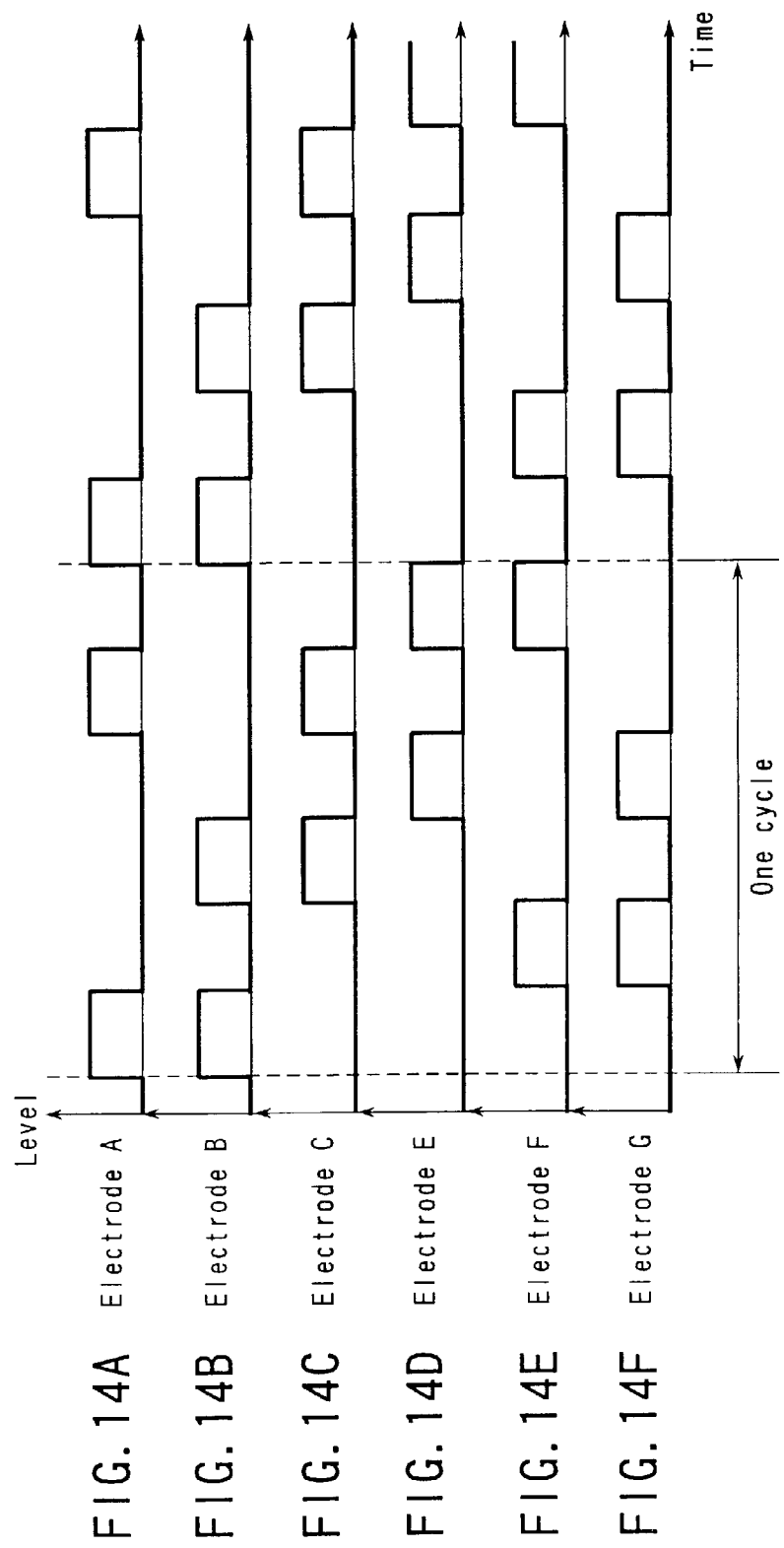
FIGS. 14A, 14B, 14C, 14D, 14E and 14F are timing charts collectively showing a pattern of the driving voltage for driving the stationary electrodes which are arranged with the phase substantially aligned in the electrostatic actuator shown in FIG. 13.

To be more specific, in the electrostatic actuator shown in FIG. 13, a first voltage pattern VP1 as shown in FIGS. 14A to 14F is applied to the stationary electrodes 12a, 12b, 12c and the stationary electrodes 13e, 13f, 13g in the case where the stationary electrodes 12a, 12b, 12c and the stationary electrodes 13e, 13f, 13g are arranged with the phase difference of substantially zero. If voltage is applied to the stationary electrodes A (12a) and B (12b) formed on the stationary member 12 as shown in FIGS. 14A and 14B, the attractive force 14 is exerted on the movable member 11 so as to drive the movable member 11 in a manner to permit the protruding electrode 16 of the movable member 11 to overlap with the stationary electrodes A (12a) and B (12b). Then, voltage is applied to the stationary electrodes F (12f) and G13f, which are positioned away from the stationary electrodes A (12a) and B (12b) by one pitch Ph in the moving direction, not to the stationary electrodes E (12e) and F (12f), which are positioned to face exactly the stationary electrodes A (12a) and B (12b), as shown in FIGS. 14E and 14F. By the voltage application to the stationary electrodes F (12f) and G (13g), the attractive force 15 is similarly exerted on the movable member 11 so as to drive the movable member 11 in a manner to permit the protruding electrode 16 of the movable member 11 to overlap with the stationary electrodes F (12f) and G (13g). Similarly, voltage is applied to the stationary electrodes B (12b) and C (12c) formed on the stationary member 12, as shown in FIGS. 14B and 14C, followed by applying voltage to the stationary electrodes G (13g) and E (12e), as shown in FIGS. 14F and 14D. Also, voltage is applied to the stationary electrodes C (12c) and A (12a) formed on the stationary member 12, as shown in FIGS. 14C and 14A, followed by applying voltage to the stationary electrodes E (12e) and F (12f), as shown in FIG. 14D and FIG. 8E. If the voltage application pattern of one cycle described above is repeated, the movable member 11 is macroscopically driven forward to the right on the paper while being microscopically vibrated in the up-down direction. As apparent from the description given above, the movable member 11 is driven backward to the left on the paper, if the order of the voltage pattern applied to the stationary electrodes 12a, 12b, 12c, 13e, 13f, 13g is reversed.

Figure 15:
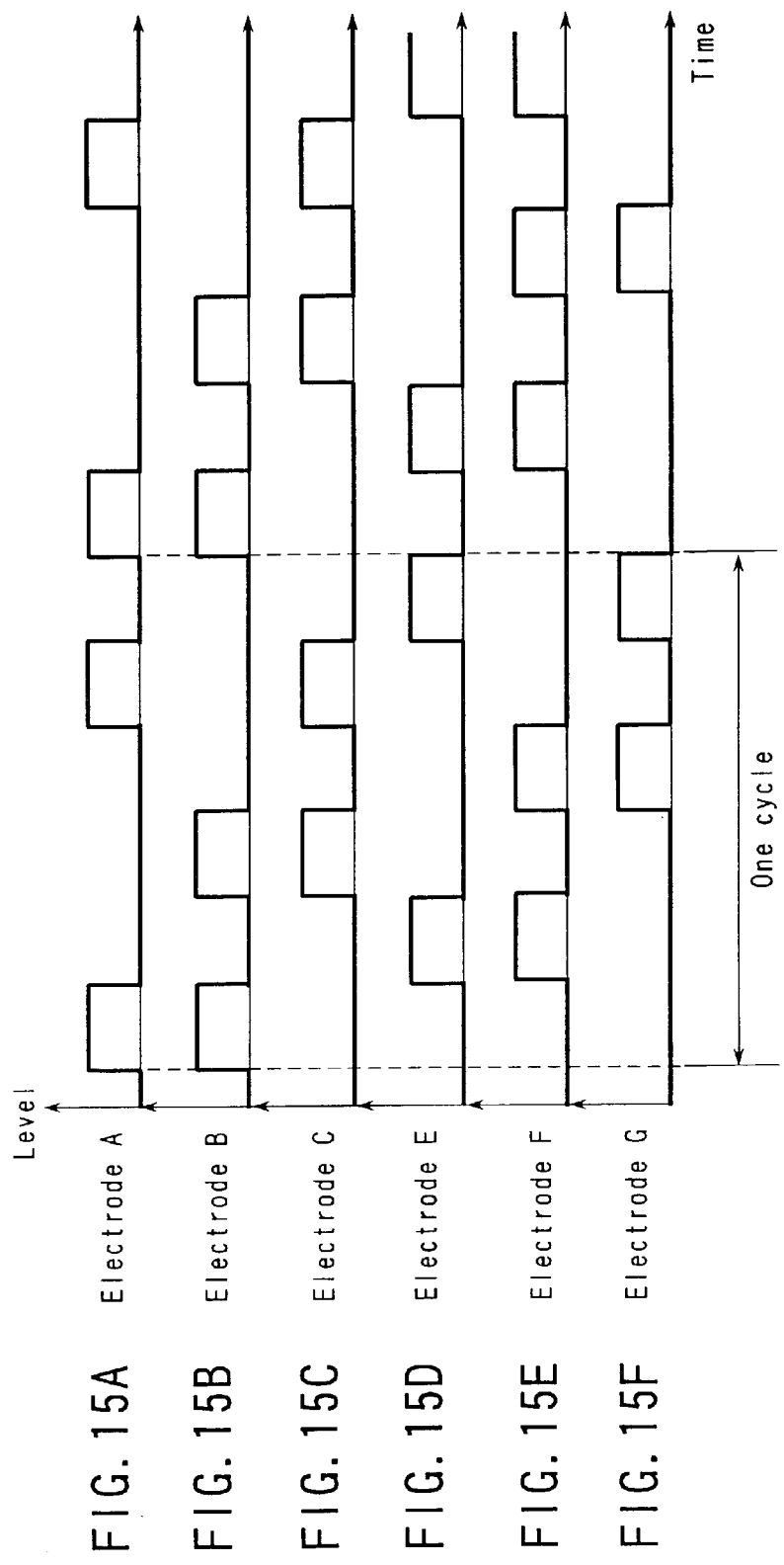
FIGS. 15A, 15B, 15C, 15D, 15E and 15F are timing charts collectively showing a pattern of the driving voltage for driving the stationary electrodes which are arranged deviant by ½ phase in the electrostatic actuator shown in FIG. 13.

In the electrostatic actuator shown in FIG. 13, the second voltage pattern VP2 as shown in FIGS. 15A to 15F is applied to the stationary electrodes 12a, 12b, 12c and the stationary electrodes 13e, 13f, 13g in the case where the stationary electrodes 12a, 12b, 12c and the stationary electrodes 13e, 13f, 13g are arranged with the phase difference of about ½. If voltage is applied to the stationary electrodes A (12a) and B (12b) formed on the stationary member 12 as shown in FIGS. 15A and 15B, the attractive force 14 is exerted on the movable member 11 so as to drive the movable member 11 in a manner to permit the protruding electrode 16 of the movable member 11 to overlap with the stationary electrodes A (12a) and B (12b). Then, voltage is applied to the stationary electrodes E (12e) and F (12f), which are positioned away from the stationary electrodes A (12a) and B (12b) by a half pitch Ph/2 in the moving direction, as shown in FIGS. 15D and 15E. By the voltage application to the stationary electrodes E (12e) and F (12f), the attractive force 15 is similarly exerted on the movable member 11 so as to drive the movable member 11 in a manner to permit the protruding electrode 16 of the movable member 11 to overlap with the stationary electrodes E (12e) and F (12f). Similarly, voltage is applied to the stationary electrodes B (12b) and C (12c) formed on the stationary member 12, as shown in FIGS. 15B and 15C, followed by applying voltage to the stationary electrodes F (12f) and G (13g), as shown in FIGS. 15E and 15F. Also, voltage is applied to the stationary electrodes C (12c) and A (12a) formed on the stationary member 12, as shown in FIGS. 15C and 15A, followed by applying voltage to the stationary electrodes C (13g) and A13a, as shown in FIGS. 15F and FIG. 15A. If the voltage application pattern of one cycle described above is repeated, the movable member 11 is macroscopically driven forward to the right on the paper while being microscopically vibrated in the up-down direction. As apparent from the description given above, the movable member 11 is driven backward to the left on the paper, if the order of the voltage pattern applied to the stationary electrodes 12a, 12b, 12c, 13e, 13f, 13g is reversed.

As apparent from the description given above relating to FIG. 13, it is possible to apply the technical idea of the present invention to the electrostatic actuator according to the embodiment of the present invention as far as the electrostatic actuator is of the type of three system or more, in which voltage is applied to at least three stationary electrodes at a different timing.

An electrostatic actuator according to another embodiment of the present invention will now be described with reference to FIGS. 16 to 20.

Figure 16:
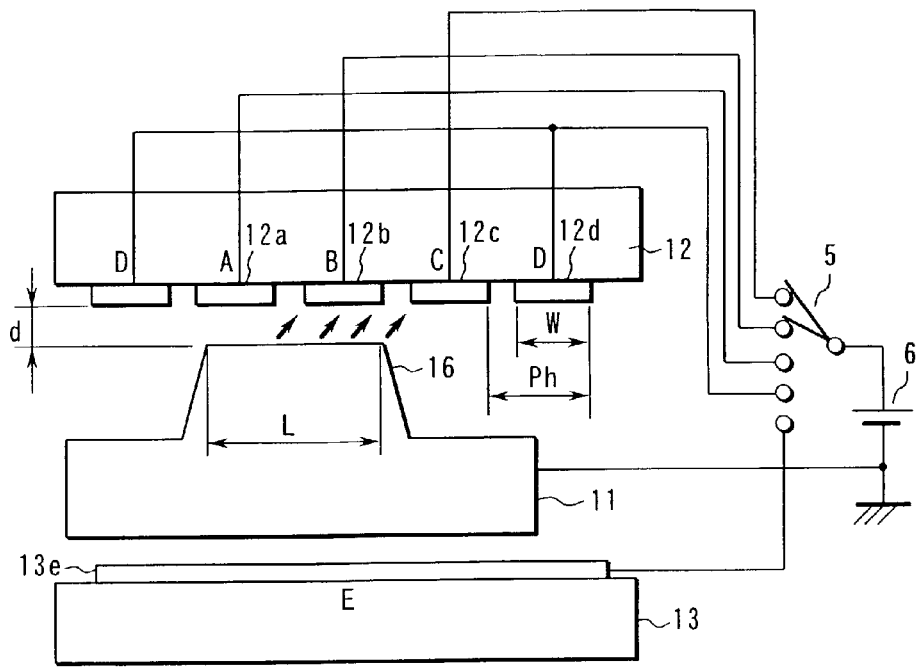
FIG. 16 is a magnified view schematically showing the operation of the electrostatic actuator according to another embodiment of the present invention.

FIG. 16 shows an electrostatic actuator called a one side propelling driving type. Unlike the both side propelling driving type electrostatic actuator, which is shown in FIG. 2, the electrostatic actuator shown in FIG. 16 comprises four stationary electrodes 12a, 12b, 12c, 12d, to which voltage is applied at a different timing and which are arranged to form a group on the stationary member 12. A plurality of these groups are successively formed on the stationary member 12. On the other hand, a single stationary electrode E (12e) is formed on the other stationary member 13.

If voltage is applied simply alternately to the stationary electrodes in the electrostatic actuator of the one side propelling driving type shown in FIG. 16, the force Fy is not generated in the moving direction in attracting the movable member 11 by applying voltage to the stationary electrode E (12e). It follows that the operation tends to be rendered unstable depending on the posture of the electrostatic actuator. On the other hand, the force Fy can be generated in the moving direction in attracting the movable member 11 toward the stationary electrode E (12e) by applying an auxiliary voltage to some of the stationary electrodes 12a, 12b, 12c, 12d formed on the stationary member 12 in accordance with the movement of the movable member 11.

Figure 17:
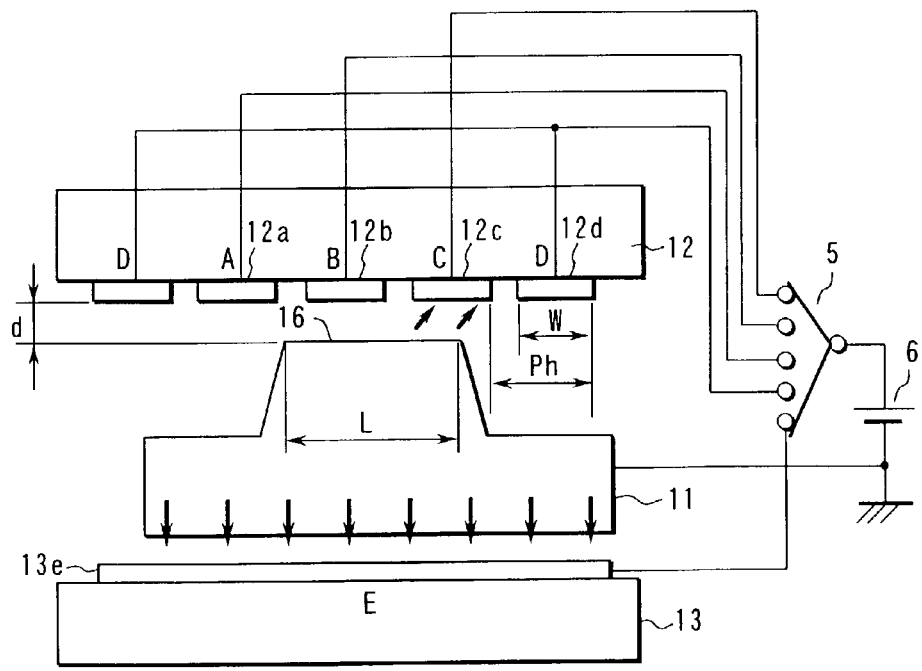
FIG. 17 is a magnified view schematically showing the operation of the electrostatic actuator according to another embodiment of the present invention.
Figure 18:
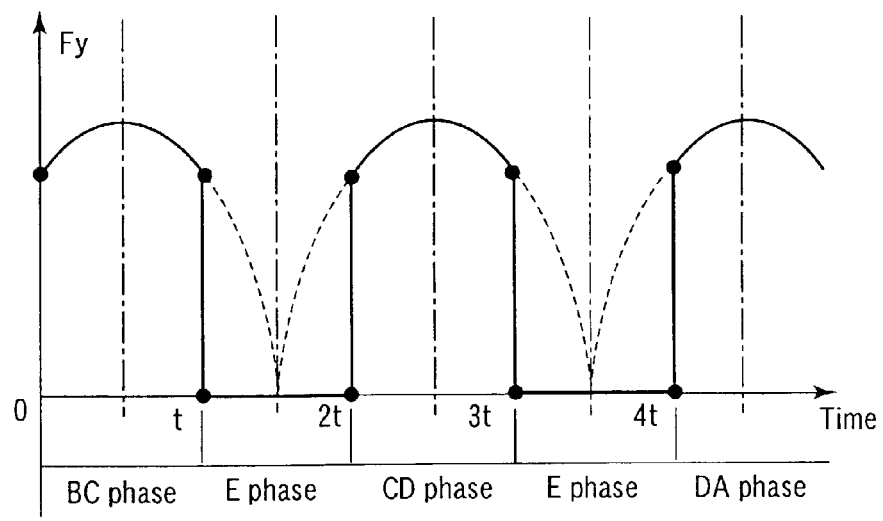
FIG. 18 is a graph showing as a comparative example the locus of the generated force in the case where the electrostatic actuator according to the embodiment shown in FIG. 16 is driven by the ordinary operation.
Figure 19:
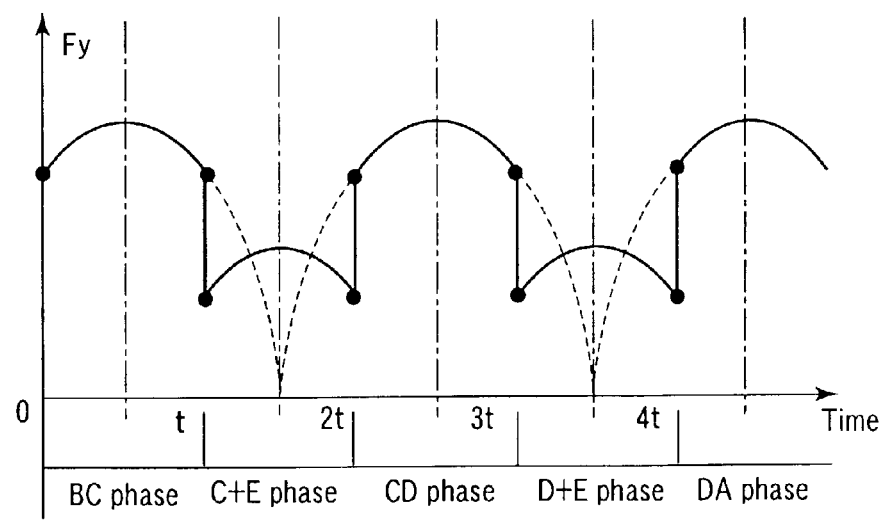
FIG. 19 is a graph covering the case where the electrostatic actuator according to the embodiment shown in FIG. 16 is driven by the operation that permits producing a force in the horizontal direction.

The principle of generating the force Fy in the moving direction in attracting the movable member 11 toward the stationary electrode F (12e) will now be described, covering the case where voltage is switched from the stationary electrodes B (12b), C (12c) to the stationary electrode E (12e). Where voltage is switched from the state shown in FIG. 16 to the stationary electrode E (12e) as shown in FIG. 17, the force Fy is generated in the movable member 11 as schematically shown in FIG. 18 when it comes to the electrostatic actuator of the ordinary one side propelling driving type. Where voltage is applied in accordance with movement of the movable member 11, i.e., where the movable member 11 is attracted toward the stationary electrode F (12e) as shown in FIG. 19, it is possible to generate the force Fy in the moving direction by applying an auxiliary voltage to the stationary electrode C (12c). Incidentally, FIG. 18 shows a comparative example serving to facilitate the understanding of this embodiment of the present invention. In this fashion, it is possible to keep the force Fy generated by applying an auxiliary voltage to any of the stationary electrodes 12a, 12b, 12c, 12d in accordance with movement of the movable member in attracting the movable member 11 toward the stationary electrode E (12e).

As a specific example, a voltage pattern shown in FIGS. 20A to 20E is applied to the stationary electrodes 12a, 12b, 12c, 12d and the stationary electrode 13e. To be more specific, voltage is applied to the stationary electrodes A (12a) and B (12b) as shown in FIG. 20A so as to permit the movable electrode 16 to be attracted toward the stationary electrodes A (12a) and B (12b). If the voltage application is switched from the stationary electrodes A (12a) and B (12b) to the stationary electrode 13e at the timing shown in FIG. 20E, the movable electrode 16 is attracted toward the stationary electrode 13e. It should be noted that, if an auxiliary voltage Vs is temporarily applied to the stationary electrode B (12b) as shown in FIG. 20B after the movable electrode 16 has begun to make a slight movement, a driving force slightly moving toward the stationary electrode B (12b) as shown in FIG. 19 is imparted to the movable electrode 16 slightly moving toward the stationary electrode 13e. As a result, the driving force Fy is generated in the movable electrode 16 even while the movable electrode 16 is being moved toward the stationary electrode 13e. As described previously, if the voltage application is switched from the stationary electrode 13e to the stationary electrodes B (12b) and C (12c), the movable electrode 16 is slightly moved toward the stationary electrodes B (12b) and C (12c) as shown in FIG. 19 as well as in FIG. 18 directed to a comparative example. Also, if the voltage application is switched from the stationary electrodes B (12b) and C (12c) to the stationary electrode 13e at a certain timing, and if the auxiliary voltage Vs is temporarily applied to the stationary electrode C (12c) as shown in FIG. 20C, a driving force slightly moving toward the stationary electrode C (12c) as shown in FIG. 19 is imparted to the movable electrode 16 slightly moving toward the stationary electrode 13e. Likewise, if the voltage application is switched from the stationary electrode 13e to the stationary electrodes C (12c) and D (13d), the movable electrode 16 is attracted toward the stationary electrodes C (12c) and D (13d). Then, if the voltage application is switched from the stationary electrode C (12c) and D (13d) to the stationary electrode 13e so as to permit the movable electrode 16 to be attracted toward the stationary electrode 13e, and if the auxiliary voltage Vs is temporarily applied to the stationary electrode D (13d) as shown in FIG. 20D, the driving force Fy in the horizontal direction is imparted to the movable electrode 16 as shown in FIG. 19. The series of operations described above are repeated so as to permit the movable member 11 to be moved forward or backward.

Incidentally, "t" in each of FIGS. 18 and 19 represents the timing at which voltage is applied to each of the stationary electrodes 12a, 12b, 12c and 12d.

Figure 23:
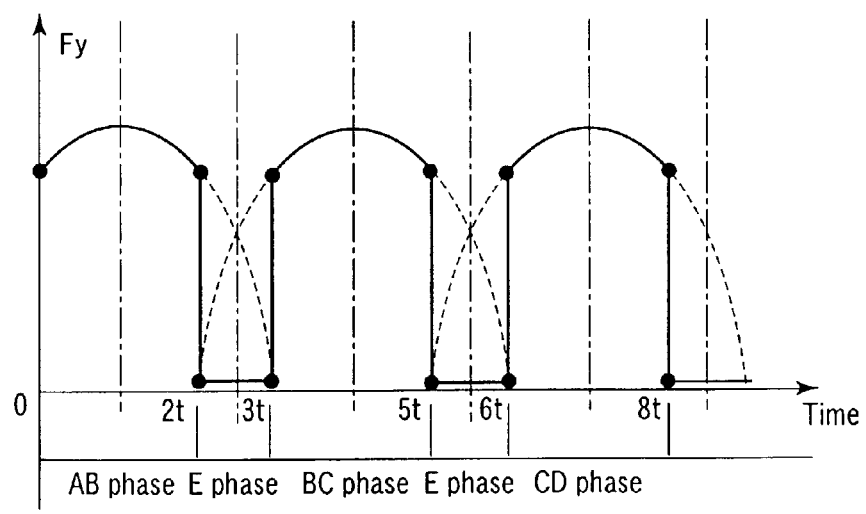
FIG. 23 is a graph showing the locus of the force generated in the electrostatic actuator that is driven by the driving voltage pattern shown in FIG. 22.

Further, an electrostatic actuator according to another embodiment of the present invention will now be described with reference to FIGS. 21 to 23.

Figure 21:
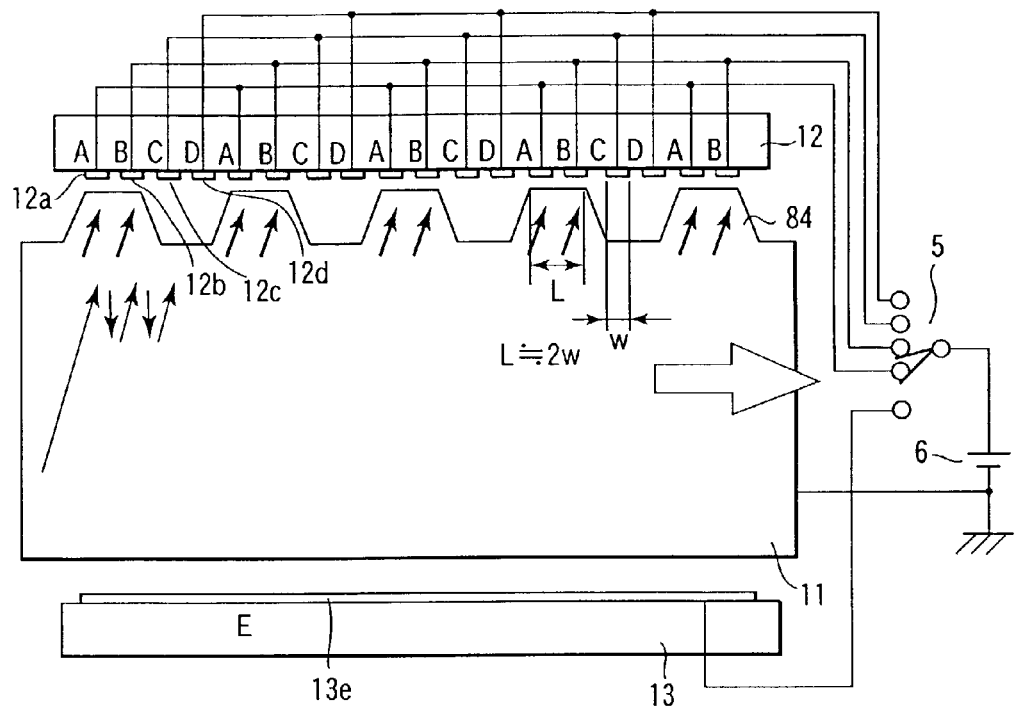
FIG. 21 is a magnified view schematically showing the operation of the electrostatic actuator according to still another embodiment of the present invention.

FIG. 21 shows an electrostatic actuator of one side propelling driving type as in FIG. 16. As described previously, in the one side propelling driving type electrostatic actuator, force is not generated in the moving direction when the movable member 11 is attracted toward the stationary electrode E (12e), with the result that the operation of the electrostatic actuator tends to be rendered unstable depending on the posture of the electrostatic actuator. In order to overcome this difficulty, changed in this embodiment is the ratio of the period during which voltage of a high level is applied to the stationary electrode E (12e) so as to permit the movable member 11 to be attracted to the stationary electrode E (12e) to the period during which voltage of a high level is applied to the stationary electrodes 12a, 12b, 12c, 12d so as to permit the movable member 11 to be attracted to the stationary electrode 12a, 12b, 12c, 12d, as shown in FIGS. 22A to 22E. The force Fy generated in the movable member 11 in the moving direction is schematically shown in FIG. 23. As shown in FIGS. 22A to 22E, the ratio of the period during which voltage of a high level is applied to each of the stationary electrodes 12a, 12b, 12c, 12d to the period during which voltage of a high level is applied to the stationary electrode E (12e) is set at 2:1. If the period during which voltage of a high level is applied to the stationary electrode E (12e) is made shorter than the period during which voltage of a high level is applied to each of the stationary electrodes 12a, 12b, 12c, 12d, it is possible to shorten the period during which the operation of the electrostatic actuator is rendered unstable under the influences given by the weight (gravitational force) of the electrostatic actuator itself accompanying the change in the posture of the electrostatic actuator itself. As a result, it is possible to suppress the unstable operation of the electrostatic actuator.

As described above, the ratio of the period during which voltage of a high level is applied to each of the stationary electrodes 12a, 12b, 12c, 12d to the period during which voltage of a high level is applied to the stationary electrode E (12e) is set at 2:1 in the embodiment described above. The reason for the particular ratio is as given below.

The standard moving speed at which the movable member 11 is moved by the operation of the electrostatic actuator is assumed to be 1.0 mm/s. In this movement, the period of the pattern shown in FIGS. 22A to 22E (one cycle) is set at 1 ms. On the other hand, the time required for the movable member 11 of the electrostatic actuator, which is attracted by the lower electrode 13e, to be moved from the upper electrodes 12a, 12b, 12c, 12d to reach the lower electrode 13e is calculated by formula (4) given below, which is based on formula (3) given below. Incidentally, formula (3) rep resents the force F generated in the lower electrode 13e so as to attract the movable member 11.

$$Fz = n \times \in (SV^2/2d^2) \quad (1)$$

$$F = \in (SV^2/2d^2) \quad (3)$$

where ∈ represents the dielectric constant, which is $8.85 \times 10^{-12}$ F/m under vacuum, S represents the electrode area of the lower electrode 13e, V represents the voltage applied to the lower electrode 13e, and d represents the distance between the movable member 11 and the lower electrode 13e.

On the other hand, the acceleration a applied to the movable member can be obtained from formula (4) given below:

$$\alpha = F/m \quad (4)$$

where m represents the sum of the mass of the movable member 11 and the mass of the load moved together with the movable member 11, e.g., the weight of the lens.

If the motion in the vertical vibration of the movable member is assumed to be a uniform acceleration motion, the time t required for the vertical vibration is represented by formula (5) given below:

$$Fy = n \times \in (MV^2/2d) \quad (2)$$

$$t = \sqrt{(2H/\alpha)} \quad (5)$$

where H represents the moving distance of the movable member 11, which corresponds to the amplitude of the vertical vibration.

If the electrode to which voltage is applied is switched before the movable member 11 is moved by the moving distance H within the gap between the upper and lower stationary electrodes when the movable member 11 is attracted by the lower electrodes 13e, the effective distance of the gap between the upper and lower stationary electrodes (or the moving distance of the movable member in practice) is decreased so as to improve the generated force for moving the movable member 11. It follows that it is necessary to make the time for attracting the movable member 11 to the stationary electrode 13e arranged in the lower portion of the electrostatic actuator shorter than the time for moving the movable member 11 toward the stationary electrodes 12a, 12b, 12d, 12d. The time, if calculated by the formula given above, is about 0.2 to 0.3 ms. Incidentally, the gap between the upper and lower electrodes, etc. are changed depending on, for example, the manufacturing accuracy of the movable member 11, with the result that the moving time is also changed.

Also, the motion of the movable member 11 in the vertical direction is affected by the viscosity of the air present in the gap between the movable member 11 and the stationary electrodes 12a, 12b, 12c, 12d or between the movable member 11 and the stationary electrode 13e. Counterforce proportional to the velocity of the movable member 11 is basically exerted on the movable member 11. It should be noted in this connection that the magnitude and direction of the counterforce are greatly changed depending on the air passageway formed, which is determined by the posture of the movable member 11 relative to the stationary electrodes 12a, 12b, 12c, 12d or the stationary electrode 13e. Therefore, if measured by conducting experiments, the moving time noted above is about 0.3 ms to 0.8 ms. In the standard speed assumed nowadays, the period of the pattern is 1 ms. Therefore, in the driving pulse applied to the stationary electrode 13e, a typical duty ratio d is set at 0.5, i.e., d=0.5.

Of course, the duty ratio d is not limited to 0.5. It is possible to set the duty ratio d based on the period of the driving pattern used such that the time required for the movable member 11 to be attracted by the stationary electrode 13e formed in the lower portion falls within a range of between 0.3 ms and 0.8 ms as described above. For example, where the moving speed of the movable member 11 is 1.0 mm/s, i.e., where the pattern period is 1 ms, the duty ratio d can be set to fall within a range of between 0.3 and 0.8, i.e., 0.3<d<0.8.

Incidentally, in the graph of FIGS. 22A to 22E showing the application timing of the voltage according to this embodiment of the present invention, the ratio of the period during which voltage of a high level is applied to each of the stationary electrodes 12a, 12b, 12c, 12d to the period during which voltage of a high level is applied to the stationary electrode E (12e) is set at 2:1. However, the period ratio noted above is not limited to 2:1 as described previously. Apparently, it is possible to use another appropriate period ratio as far as it is possible to satisfy the conditions that permit the period during which voltage of a high level is applied to the stationary electrode E (12e) to be shorter than the period during which voltage of a high level is applied to each of the stationary electrodes 12a, 12b, 12c, 12d. In the embodiment described above, the movable member 11 is slightly driven by application of voltage of a high level to each of the stationary electrodes 12a, 12b, 12c, 12d in the case where the movable electrode 16 of the movable member 11 has the ground potential. On the other hand, the movable member 11 is slightly driven by application of voltage of a low level to each of the stationary electrodes 12a, 12b, 12c, 12d in the case where the potential of the movable electrode 16 of the movable member 11 is maintained at a high level. It follows that, in this embodiment, the situation is apparently changed to the condition that the period during which voltage of a low level is applied to the stationary electrode E (12e) is shorter than the period during which voltage of a low level is applied to each of the stationary electrodes 12a, 12b, 12c, 12d.

It is also apparent that it is possible to change appropriately the voltage application period as shown in FIGS. 22A to 22E and, at the same time, to apply voltage to the other stationary electrodes in the period during which voltage is applied to the stationary electrode E (12e) as shown in FIG. 20.

Further, in order to improve the generated force for moving the movable member 11, the time for the movable member 11 to be attracted toward the stationary electrode E (12e) arranged in the lower portion of the electrostatic actuator is set shorter than the time for the movable member 11 to be attracted toward the stationary electrodes 12a, 12b, 12c, 12d. The particular situation will now be described more in detail with reference to FIGS. 24 to 28.

Figures 24A, 24B:
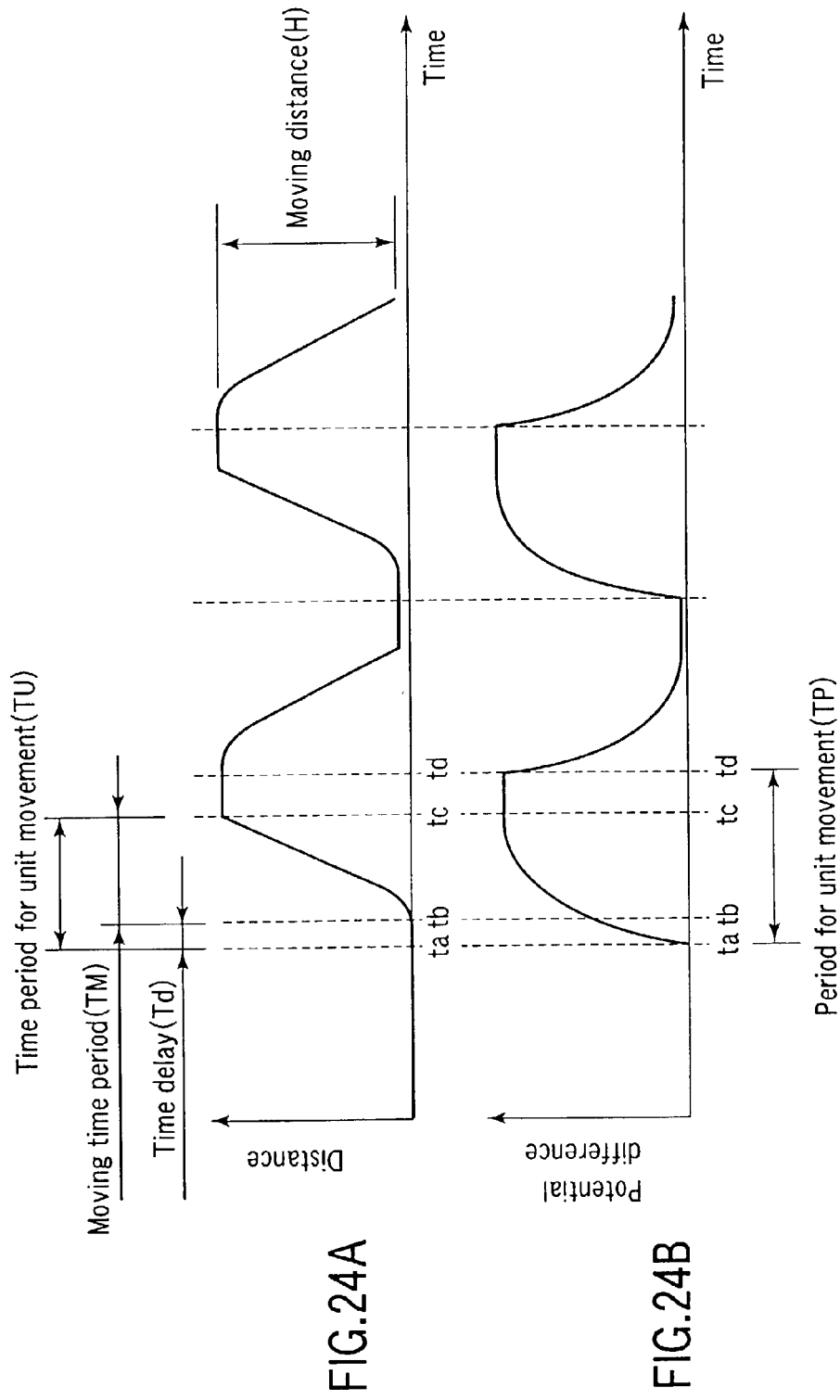
FIG. 24A is a graph showing the wave form denoting the movement of the movable member included in the electrostatic actuator shown in FIG. 21.
FIG. 24B is a graph showing the wave form denoting the change in the voltage applied between the stationary electrode and the movable member in the electrostatic actuator shown in FIG. 21.

FIG. 24A shows the moving distance of the movable member 11 and the time required for the movement when the movable member 11 is vibrated in the vertical direction. On the other hand, FIG. 24B shows the change in the potential difference between the stationary member 13 and the movable member 11, which is generated by application of voltage to the stationary electrode 13e on the lower side. If a driving voltage is imparted to the stationary electrode 13e at a certain time point ta under the state that the movable member 11 is attracted toward the stationary electrodes 12a, 12b, 12c, 12d as shown in FIG. 24B, the movable member 11 begins to be moved toward the stationary member 13 at time point tb, a certain time delay Td residing between the time point ta and the time point tb, as shown in FIG. 24A.

If the potential difference between the stationary member 13 and the movable member 11 is increased as shown in FIG. 24B, the movable member 11 is moved toward the stationary member 13 at a moving speed Vm. At time point tc a certain moving time TM after the time point tb, the movable member 11 is positioned on the side of the stationary member 13 and retained as it is. Then, the potential difference between the stationary member 13 and the movable member 11 is lowered and, at the same time, the movable member 11 begins to be moved toward the stationary electrodes 12a, 12b, 12c, 12d at time point td, as shown in FIG. 24B. It should be noted that the moving speed Vm is obtained by dividing the moving distance H by the moving time TM. Also, the time between the time point ta when a driving voltage is applied to the stationary electrode 13e and the time point tc when the movable member 11 is positioned on the side of the stationary electrode 13e is defined as time period TU required for the unit movement of the movable member 11 (movement of the movable member with the moving distance H providing a unit). The time period TU corresponds to the time obtained by adding the time delay Td to the moving time TM (time period TU required for the unit movement=time delay Td+moving time TM).

It should be noted that the movable member 11 can be kept in contact with the teeth-like stationary electrodes 12a, 12b, 12c, 12d in attracting the movable member 11 to the stationary electrode 13e by shortening the attracting time corresponding to the moving time TM. By driving the movable member 11 in this fashion, a greater driving force in the horizontal direction is imparted to the movable member 11. It should be noted in this connection that, in the case of the moving time TM, the driving force in the horizontal direction is scarcely generated in the movable member 11, and the movable member is simply directed toward the stationary electrode 13e by the driving force in the vertical direction.

It is important for the attracting time toward the lower stationary electrode 13e, which corresponds to the moving time TM, to be shorter than the time required for the vibration of the movable member in the vertical direction, i.e., the time period TU required for the unit movement, and longer than the so-called "delay time Td" between the time point when a driving pulse signal is given to the lower stationary electrode 13e so as to permit the instruction value of the driving pulse signal to begin to change the voltage and the time point when the movable member 11 gives reaction to the change in the voltage. In other words, it is necessary for the time TM for the movable member to be attracted by the lower stationary electrode 13e to satisfy the formula "time delay Td<attracting time TM by the lower stationary electrode<time period TU required for the unit movement".

Figure 25:
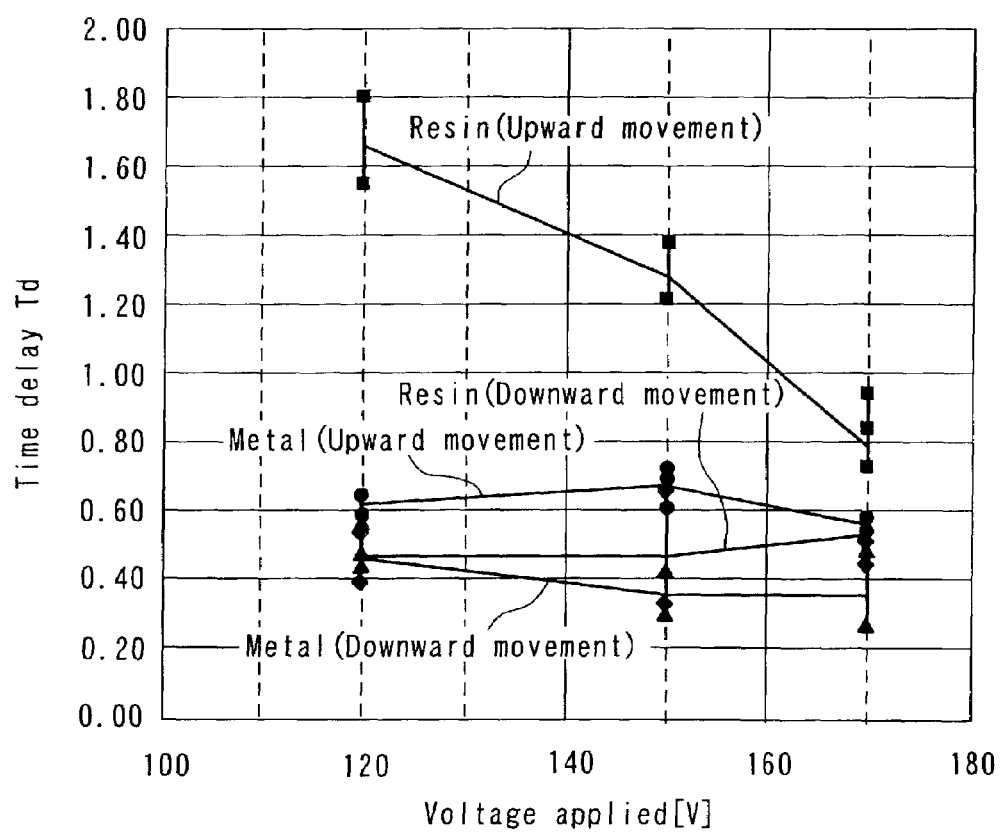
FIG. 25 is a graph showing the relationship between the electrical resistance and the time delay Td in the case where the applied voltage is set at 150V in the electrostatic actuator shown in FIG. 21.
Figure 26:
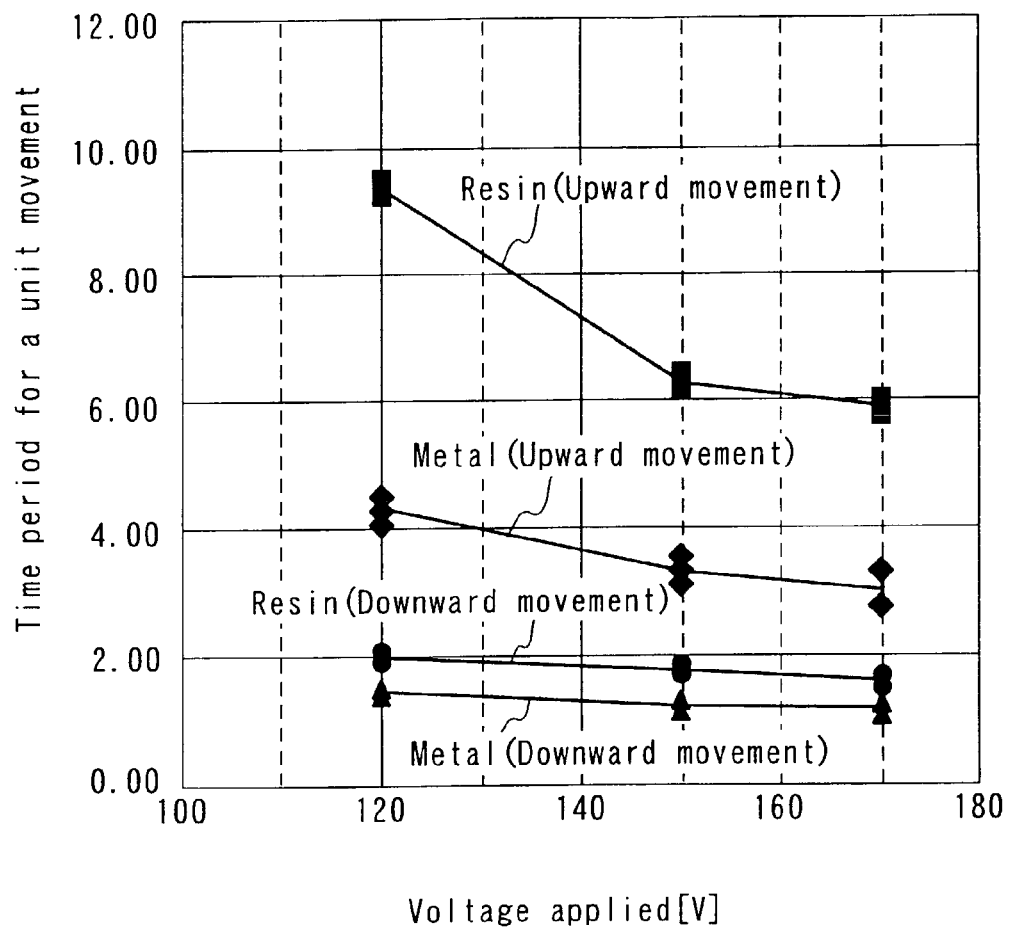
FIG. 26 is a graph showing the relationship between the electrical resistance and the time period TU required for a unit movement in the case where the applied voltage is set at 150V in the electrostatic actuator shown in FIG. 21.

The delay time Td and the time period TU required for the unit movement are changed depending on the electrical conductance of the movable member. To be more specific, the delay time Td and the time period TU required for the unit movement are changed depending on the electrical resistivity of the material used for forming the movable member. FIG. 25 is a graph showing the relationship between the electrical resistivity and the time delay Td in the voltage application of 150V. On the other hand, FIG. 26 is a graph showing the relationship between the electrical resistivity and the time period TU required for the unit movement in the voltage application of 150V. In obtaining the data given in FIGS. 25 and 26, the measurement was applied to two points for each of the movable member formed of a titanium material having an electrical resistance of 0.5Ω and the movable member formed of a resin material (trade name of Pochicon) having an electrical resistance of 250Ω under the voltage application of each of 120V, 150V and 170V , and the values between the two measured points were obtained by the interpolation. As shown in FIGS. 25 and 26, the time delay Td and the time period TU required for the unit movement during the upward movement differ from those during the downward movement. This is because the time delay Td and the time period TU required for the unit movement are affected by the gravity during the upward movement.

Figure 27:
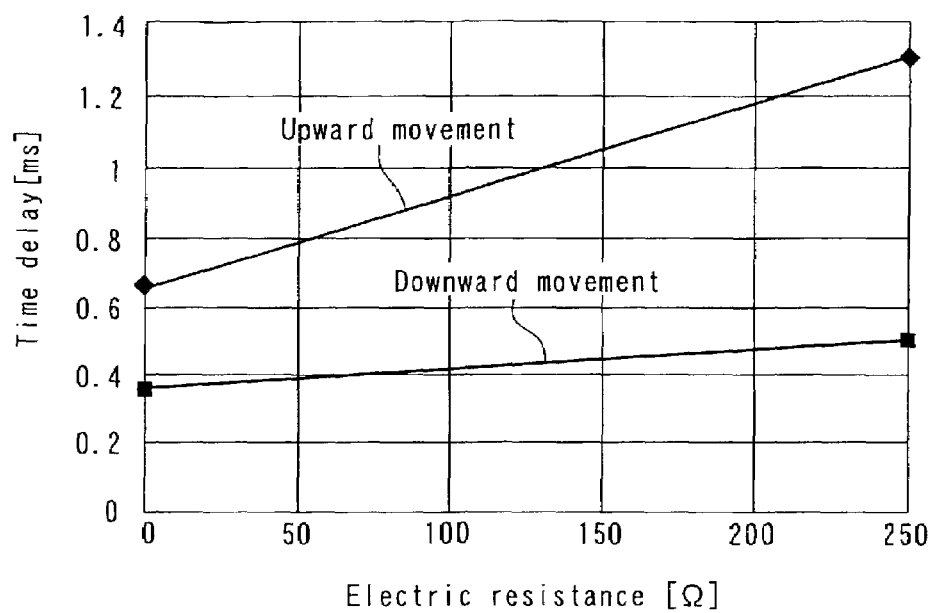
FIG. 27 is a graph showing the relationship between the electrical resistance of the movable member and the time delay Td in the electrostatic actuator shown in FIG. 21.
Figure 28:
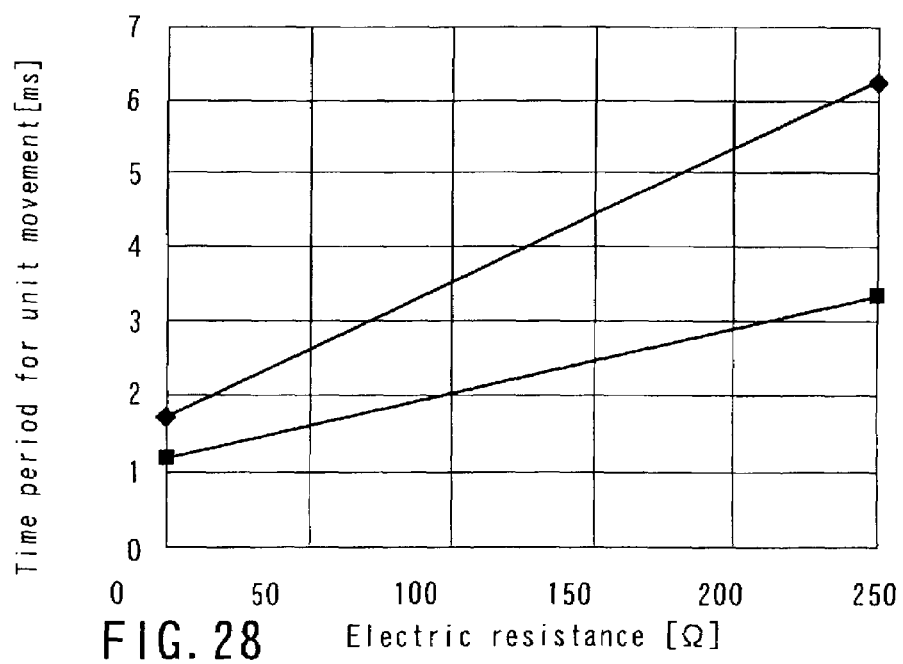
FIG. 28 is a graph showing the relationship between the electrical resistance of the movable member and the time period TU required for a unit movement in the electrostatic actuator shown in FIG. 21.

How to select the time delay Td and the time period TU required for the unit movement under a certain voltage application, e.g., when the applied voltage is set at 150V as shown in FIGS. 27 and 28, will now be described, covering case where the movable member 11 is formed of titanium. The electrical resistance of the titanium material was about 0.5Ω. This value is changed depending on the shape of the movable member 11. For example, the electrical resistance of the movable member 11 is naturally increased if the volume of the movable member 11 is increased. As shown in FIG. 27, the time delay Td of the movable member 11 was about 0.6 ms during the upward movement and was about 0.4 ms during the downward movement of the movable member 11. Also, the time period TU required for the unit movement was about 1.7 ms during the upward movement and was about 1.2 ms during the downward movement of the movable member 11, as shown in FIG. 27. Therefore, in order to drive the movable member 11 such that the movable member 11 is not brought into contact with the lower stationary electrode 13e and as if the movable member 11 is attracted to the teeth-shaped stationary electrodes 12a, 12b, 12c, 12d regardless of the posture of the electrostatic actuator, it is necessary make the attracting time TM of the lower stationary electrode 13e longer than 0.6 ms and shorter than 1.2 ms, i.e., 0.6 ms<Tm<1.2 ms. It should be noted that it is important for the time delay Td during the upward movement, which is about 0.6 ms, to be shorter than the time required for the unit movement during the downward movement, which is about 1.2 ms. If this condition is not satisfied, it is difficult to obtain a sufficient effect unless the time for applying voltage to the lower stationary electrode is changed depending on the posture of electrostatic actuator. Where the applied voltage is changed, and where the material (electrical resistance) of the material used for forming the movable member is changed, it is possible to determine the time for applying voltage to the lower stationary electrode by the procedure similar to that described above. Incidentally, the time delay Td and the time period TU required for the unit movement are changed under the influences given by the resistance value depending on the change in the size of the movable element 11 (where the resistivity is the same, the resistance value is increased with increase in the volume) and the weight of the load. Therefore, in manufacturing a movable member and determining the time for applying voltage to the lower stationary electrode, it is necessary to measure first the applied voltage, the electrical resistance, the time delay Td and the time period TU required for the unit movement referred to above and, then, to determine the time for applying voltage to the lower stationary electrode based on the results of the measurement.

Figure 29:
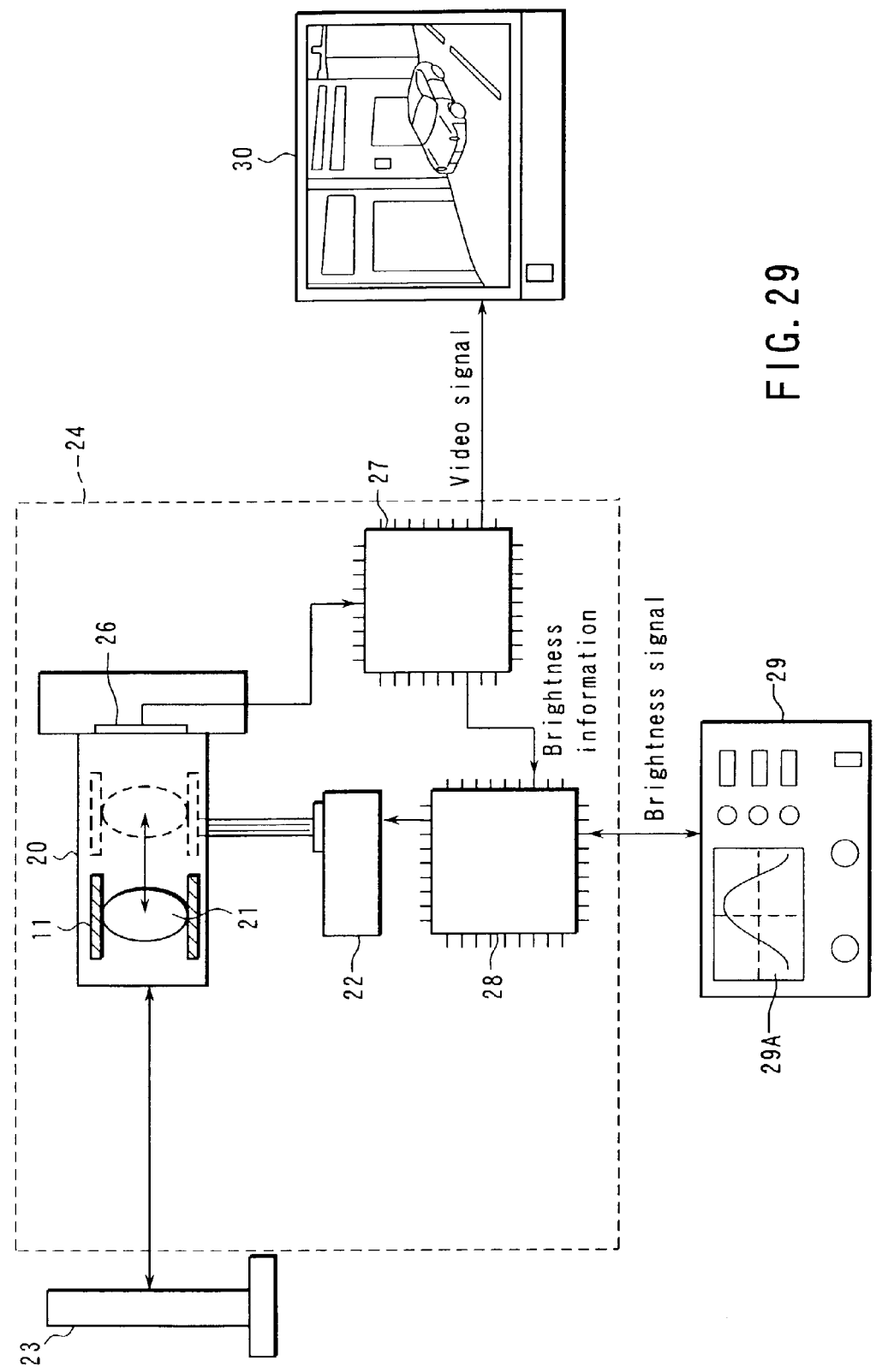
FIG. 29 is a block diagram exemplifying a camera system in which is incorporated a circuit for optimizing a pattern of the driving signal for driving the electrostatic actuator according to another embodiment of the present invention.

In the embodiment described above, a plurality of driving patterns are prepared in advance, and the driving pattern adapted for the arrangement of the upper and lower stationary electrodes is selected and applied. In the case of preparing a plurality of driving patterns as described above, it is possible to select an appropriate driving pattern by utilizing a video information as shown in FIG. 29 in selecting the appropriate driving pattern. The system for selecting the appropriate driving pattern will now be described with reference to FIG. 29.

A reference numeral 20 shown in FIG. 29 represents the electrostatic actuator according to the embodiment described above. An objective lens system 21 is arranged in the void portion of the movable member 11 included in the electrostatic actuator 20, and the driving circuit 22 for driving the movable member 10 as described previously is connected to the electrostatic actuator 20. The electrostatic actuator 20 is housed as a camera module in a still or movie camera 24. The objective lens system 21 is arranged to face an object 23, and a pickup element 26 (CCD or CMOS) is fixed within the electrostatic actuator 20 or within the camera 24. The objective lens system 21 and the pickup element 26 are arranged to permit the image of the object photographed by the objective lens system 21 to be formed on the pickup element 26. A pixel signal is supplied from the pickup element 26 to a video processing circuit 27, e.g., a video processing IC, with the result that the pixel signal is processed so as to be converted into a video signal. The video signal is supplied from the video processing circuit 27 to the camera or a monitor 30 arranged outside the camera, with the result that the image of the object is displayed on the monitor 30. A drive processing circuit 28 for selecting the driving pattern is connected to the video processing circuit 27, e.g., the video processing IC, and the brightness signal contained in the video signal or a brightness information (analog or digital brightness information) is supplied to the drive processing circuit 28.

In order to select the driving signal pattern in the system of the camera 24 shown in FIG. 29, the drive processing circuit 28 is connected to the measuring device 29 arranged outside the camera 24 as shown in FIG. 29 and the driving signal pattern is selected by the principle given below.

In selecting the driving signal pattern, the object 23 is arranged a predetermined distance L forward of the camera, and a certain driving pattern is given from the driving circuit 22 to the electrostatic actuator 20. At the same time, the pickup element 26 is driven so as to permit the video processing circuit 27 to give a brightness value information to the drive processing circuit 28. As a result, the brightness value information is monitored by the measuring device 29. In general, it is known to the art that the largest value can be obtained when the camera is focused on the object 23. Therefore, the largest brightness value can be measured when the movable member 11 is allowed to be moved to permit the camera to be focused on the object by monitoring the brightness value.

If the driving signal pattern generated from the driving circuit 22 is appropriate, the movable member 11 within the electrostatic actuator 20 is moved so as to permit the objective lens system 21 to make a back and forth reciprocating movement a plurality of times within the electrostatic actuator 20. It follows that the brightness value, in which the peak value is caused to appear periodically by the reciprocating movement of the objective lens 21, is displayed on a display section 29A within the measuring device 29 shown in FIG. 29. To be more specific, the objective lens 21 is moved and, in addition, when the objective lens 21 passes through the same position during the reciprocating movement, the peak value is displayed periodically on the display section 29A within the measuring device 29. Where the peak value appears periodically in this fashion, the driving circuit 28 supplies a lock signal to the driving circuit 22 such that the driving pattern is kept supplied to the electrostatic actuator 20 on the basis that an appropriate driving pattern is supplied from the driving circuit 22 to the electrostatic actuator 20. As a result, the driving patterns generated from the driving circuit 22 are controlled so as to be defined to one of these driving patterns.

On the other hand, where the brightness value is monotonously increased or monotonously decreased, or where, although there is a peak value in the brightness value, the period for driving the movable member 11 is widely deviated from the period in which the peak value appears, the drive processing circuit 28 judges that the driving pattern is not appropriate so as to control the driving circuit 22 in a manner to allow the driving circuit 22 to impart another driving pattern to the electrostatic actuator 20 on the basis that the movable member 11 is not moved or the movable member 11 is not driven by an appropriate driving pattern.

As described above, it is possible to detect in the present invention that the movable member 11 is moved appropriately by measuring the device having the electrostatic actuator incorporated therein even if a sensor for detecting the movement of the movable member is not arranged in the electrostatic actuator, or even if it is not visually confirmed that the movable member 11 is moved appropriately within the electrostatic actuator 20.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrostatic actuator, comprising:
   a first stationary member provided with a first electrode group which includes at least three first stationary electrodes each having a first width and sequentially arranged at a pitch in a predetermined direction;
   a second stationary member arranged to face the first stationary member and provided with a second electrode group which includes at least three second stationary electrodes each having the first width and arranged at the pitch in the predetermined direction;
   a movable member configured to be movable in the predetermined direction, which is arranged between the first and second stationary members and is provided with first and second movable electrodes faced to the first and second stationary electrodes, respectively;
   a signal generator configured to generate one of first and second voltage signals having different first and second timing patterns, respectively, and to apply the one of the first and second voltage signals alternately to the first and second stationary electrodes, the movable member being driven in response to the first voltage signal if the first and second stationary electrodes are arranged to be substantially in phase, and in response to the second voltage signal if the first and second stationary electrodes are arranged to be out of phase;
   a detector configured to detect a movement of the movable member to generate a movement signal in accordance with an application of the one of the first and second voltage signals; and
   a setting circuit configured to set the one of the first and second timing patterns in response to the movement signal.

2. The electrostatic actuator according to claim 1, wherein the signal generator simultaneously applies the one of the first and second voltage signals to the adjacent electrodes in each of the first and second electrode groups.

3. The electrostatic actuator according to claim 1, wherein each of the first and second movable electrodes has a second width in the predetermined direction larger than the first width.

4. The electrostatic actuator according to claim 3, wherein each of the first and second movable electrodes has the second width that is 1.5 to 2.5 times as much as the first width.

5. The electrostatic actuator according to claim 1, wherein the first and second widths are substantially equal.

6. The electrostatic actuator according to claim 1, wherein the first and second movable electrodes have a same width.

7. The electrostatic actuator according to claim 3, wherein the first and second stationary electrodes are out of phase by ¼ to ½ pitch.

8. The electrostatic actuator according to claim 1, wherein the movable member is driven in response to the second voltage signal if the first and second stationary electrodes are substantially arranged to have a half phase difference.

* * * * *